(12) United States Patent
You et al.

(10) Patent No.: US 12,012,680 B2
(45) Date of Patent: Jun. 18, 2024

(54) NON-WOVEN FIBROUS WEB AND METHODS THEREOF

(71) Applicant: 3M INNOVATIVE PROPERTIES COMPANY, St. Paul, MN (US)

(72) Inventors: Jinzhang You, Shanghai (CN); Jonathan H. Alexander, Roseville, MN (US); Michael R. Berrigan, Oakdale, MN (US); Akira Ito, Tokyo (JP); Xiaojun Su, Shanghai (CN); Qinrong Wu, Shanghai (CN); Liyun Ren, Woodbury, MN (US); Thomas P. Hanschen, Mendota Heights, MN (US); Daniel J. Zillig, Woodbury, MN (US); Sachin Talwar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 106 days.

(21) Appl. No.: 16/607,258

(22) PCT Filed: Sep. 15, 2017

(86) PCT No.: PCT/CN2017/101857
§ 371 (c)(1),
(2) Date: Oct. 22, 2019

(87) PCT Pub. No.: WO2019/051761
PCT Pub. Date: Mar. 21, 2019

(65) Prior Publication Data
US 2020/0299877 A1    Sep. 24, 2020

(51) Int. Cl.
*D04H 1/56*       (2006.01)
*D04H 1/4291*   (2012.01)
(Continued)

(52) U.S. Cl.
CPC .............. *D04H 1/56* (2013.01); *D04H 1/4291* (2013.01); *D04H 3/14* (2013.01); *D04H 3/16* (2013.01);
(Continued)

(58) Field of Classification Search
CPC .......... D04H 1/56; D04H 1/4291; D04H 1/43; D04H 1/4326; D04H 1/4334; D04H 1/435;
(Continued)

(56) References Cited

U.S. PATENT DOCUMENTS

| 4,118,531 A | 10/1978 | Hauser |
| 5,332,426 A | 7/1994 | Tang |

(Continued)

FOREIGN PATENT DOCUMENTS

| CA | 2887054 | 4/2014 |
| CN | 101685630 | 3/2010 |

(Continued)

OTHER PUBLICATIONS

Melt blowing technology Michael Wehmann & W. John G. McCulloch Part of the Polymer Science and Technology Series book series (POLS,vol. 2) (Year: 1999).*

(Continued)

*Primary Examiner* — Lynda Salvatore
(74) *Attorney, Agent, or Firm* — Philip P. Soo

(57) ABSTRACT

The provided articles, assemblies, and methods use a non-woven fibrous web (50) having one or more layers (60) that are densified in situ to provide a layer that is densified relative to one or more adjacent layers, collectively within a unitary non-woven construction. The non-woven web (50) can be made from fibers having a composition and/or structure that resist shrinkage induced by polymer crystallization when subjected to high temperatures. Advanta- (Continued)

geously, the provided non-woven webs (50) can be molded to form a three-dimensional shaped article that displays dimensional stability.

11 Claims, 3 Drawing Sheets

(51) Int. Cl.
*D04H 3/14* (2012.01)
*D04H 3/16* (2006.01)

(52) U.S. Cl.
CPC .............. *B01D 2239/0622* (2013.01); *B01D 2239/1233* (2013.01); *B32B 2262/0253* (2013.01); *B32B 2262/0276* (2013.01); *B32B 2307/718* (2013.01)

(58) Field of Classification Search
CPC ...... D04H 1/4358; D04H 1/54; D04H 1/5416; D04H 1/558; D04H 1/559; D04H 3/005; D04H 3/007; D04H 3/009; D04H 3/011; D04H 3/14; D04H 3/16; B01D 2239/0622; B01D 2239/1233; B32B 2262/0253; B32B 2262/0276; B32B 2307/718; B32B 5/14
See application file for complete search history.

(56) References Cited

U.S. PATENT DOCUMENTS

| | | |
|---|---|---|
| 5,459,291 A | 10/1995 | Haines |
| 5,824,973 A | 10/1998 | Haines |
| 6,217,691 B1 | 4/2001 | Vair, Jr. |
| 6,256,600 B1 | 7/2001 | Bolton |
| 6,720,068 B1 | 4/2004 | Vanbemmel |
| 6,893,711 B2 | 5/2005 | Williamson |
| 7,279,440 B2 | 10/2007 | Berrigan |
| 7,320,739 B2 | 1/2008 | Thompson, Jr. |
| 7,357,974 B2 | 4/2008 | Rockwell |
| 7,757,811 B2 | 7/2010 | Fox |
| 8,637,414 B2 | 1/2014 | Gomez |
| 8,906,815 B2 | 12/2014 | Moore |
| 9,139,940 B2 | 9/2015 | Berrigan |
| 9,194,065 B2 | 11/2015 | Moore |
| 9,487,893 B2 | 11/2016 | Moore |
| 2003/0199216 A1 | 10/2003 | Gomez |
| 2004/0000740 A1 | 1/2004 | Chi |
| 2006/0254855 A1* | 11/2006 | Loftus ............... E04B 1/84 181/293 |
| 2008/0038976 A1 | 2/2008 | Berrigan |
| 2009/0286893 A1 | 11/2009 | Shih |
| 2011/0100748 A1 | 5/2011 | Nonogi |
| 2016/0298266 A1 | 10/2016 | Zillig |

FOREIGN PATENT DOCUMENTS

| | | | |
|---|---|---|---|
| CN | 101934604 | 1/2011 | |
| CN | 105252871 | 1/2016 | |
| CN | 205130552 | 4/2016 | |
| DE | 3336536 | 4/1985 | |
| EP | 0836877 | 4/1998 | |
| EP | 1527221 | 5/2005 | |
| EP | 2 484 826 | 8/2012 | |
| JP | H08143184 | 6/1996 | |
| JP | 4030484 | 10/2007 | |
| JP | 5791843 | 8/2015 | |
| KR | 10136177 | 9/2013 | |
| WO | WO 1997/045581 | 12/1997 | |
| WO | WO 2003/050361 | 6/2003 | |
| WO | WO 2004-013395 | 2/2004 | |
| WO | WO 2009/042996 | 4/2009 | |
| WO | WO 2015080913 A1 * | 6/2015 | ............ D04H 17/00 |
| WO | WO 2016189239 * | 12/2016 | ............ C08L 67/03 |

OTHER PUBLICATIONS

Supplementary Partial EP Search Report for EP Patent Application No. 17925464.4 (2 pages) Mar. 16, 2021.
Wente, "Superfine Thermoplastic Fibers", Industrial Engineering Chemistry, 1956, vol. 48, pp. 1342-1346.
Wente, "Manufacture of Superfine Organic Fibers", (1954) NRL Report 4364, 19 pages.
International Search report for PCT International Application No. PCT/CN2017/101857 mailed on Jun. 8, 2018, 5 pages.
M. Zouheir Jandali, Georg Widmann, "Thermoplastics", Application Handbook Thermal Analysis, translated by Liming Lu et al., Donghua University Press, Jul. 2008, pp. 18-19.

* cited by examiner

NON-WOVEN FIBROUS WEB AND METHODS THEREOF

CROSS REFERENCE TO RELATED APPLICATIONS

This application is a national stage filing under 35 U.S.C. 371 of PCT/CN2017/101857 filed Sep. 15, 2017, the disclosure of which is incorporated by reference in its entirety herein.

FIELD OF THE INVENTION

Provided are non-woven fibrous webs that are suitable for use in thermal and acoustic applications. The provided non-woven fibrous webs can be particularly suitable for reducing noise in automotive and aerospace applications.

BACKGROUND

Use of lightweight materials, or "lightweighting," has become increasingly important to manufacturers in the transportation industry. Minimizing fuel consumption has become a priority, and reducing vehicle weight is one of the simplest ways to accomplish this. Further, state-of-the-art material technologies have enabled weight to be reduced without effecting performance or significantly increasing manufacturing costs.

Lightweighting opportunities exist in many hidden parts of a vehicle, such as acoustical insulation used in automobiles, commercial vehicles, and aircraft. Traditionally, interior and exterior acoustical insulators used heavy layers in decoupled mass systems to reduce noise, vibration, and harshness encountered when operating these vehicles. While such materials can provide a quieter environment for vehicle occupants, they tend to be heavy. Over time, these insulators have given way to lighter, fibrous materials made from sound absorbing fibers. Foam padding materials have also been used for this purpose.

These same materials are also often used to provide thermal insulation. Whether they are used in a sleeper cab of a commercial truck or the cabin of a commercial airplane, thermal and acoustic insulation can be critical in providing safety and comfort for passengers in extreme outdoor temperatures.

SUMMARY

Non-woven materials are known for use as lightweight thermal or acoustic insulator applications. THINSULATE brand acoustic insulation materials by 3M Company, St. Paul MN, for example, contain polyester and polypropylene fibers that produce a high-energy absorption characteristic with low weight.

Traditional non-woven materials, however, tend to shrink or otherwise change shape at high temperatures and their lack of dimensional stability. While certain non-woven materials can withstand such high temperatures, these do not display acceptable acoustic absorption at relevant noise frequencies. Further, these materials generally do not hold their shape under gravity, thus complicating the task of fastening them to complex three dimensional surfaces. Non-woven materials also tend to be delicate and damage easily in handling and installation. Melting the fibers or incorporating a support layer can increase strength, but the effectiveness of these materials as insulators is often predicated on having a high surface area per unit volume. These approaches displace the fine fibers in the non-woven material, which can reduce its effectiveness—an unfortunate trade off.

Manufacturing considerations can also be significant when addressing these problems. For instance, one solution is to use multilayered constructions, in which the non-woven is laminated or bonded to other layers. While these can help achieve the acoustic performance and mechanical requirements of a thermal or acoustic application, additional layers need to be separately fabricated and attached to each other in a secondary bonding operation. The result is added complexity and costs associated with the product and its manufacture.

Provided herein are non-woven fibrous webs that have one or more layers processed in situ to provide a densified layer alongside one or more adjacent layers within a unitary construction. The non-woven web is made from fibers having a composition and/or structure that resists shrinkage induced by polymer crystallization and/or relaxation of oriented polymer molecules when subjected to high temperatures. Advantageously, the provided non-woven webs can be molded into a three-dimensional shape. Compared with alternatives such as molded fiberglass with a reactive binder, these webs can be molded with a cycle time of less than 1 minute (compared with several minutes for molded fiberglass).

The provided webs can be used in any of a variety of thermal and acoustic solutions in commercial and industrial products. Exemplary applications include, for example, pillar, fender, rear luggage tray, front of dash, and engine cover structures in an automobile. Compared with existing solutions, such as polyurethane acoustic absorbers, the provided non-woven fibrous webs offer significant weight savings, simplified manufacturing, and reduced costs.

In a first aspect, a non-woven fibrous web is provided. The non-woven fibrous web comprises: a plurality of fibers comprising a thermoplastic polymer; and a plurality of heterogeneous inclusions evenly distributed throughout the plurality of fibers; wherein the non-woven fibrous web has at least one major surface processed to form a layer that is densified relative to a remaining portion of the non-woven fibrous web.

In a second aspect, a non-woven fibrous web is provided, comprising: a plurality of fibers comprising one or more aliphatic polyesters selected from polylactic acid, polyglycolic acid, poly(lactic-co-glycolic acid), polybutylene succinate, polyhydroxy-butyrate, polyhydroxyvalerate, and blends and copolymers thereof; wherein the non-woven fibrous web has at least one major surface processed to form a layer that is densified relative to a remaining portion of the non-woven fibrous web.

In a third aspect, a non-woven fibrous web is provided, comprising: a plurality of first fibers comprising one or more thermoplastic semicrystalline polyesters and having a median diameter of up to 10 micrometers; wherein the non-woven fibrous web has at least one major surface processed to form a layer that is densified relative to a remaining portion of the non-woven fibrous web.

In a fourth aspect, a non-woven fibrous web is provided, comprising: a plurality of fibers having a median fiber diameter of up to 6 micrometers, wherein the plurality of fibers comprise at least 35 weight % of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a copolymer or blend thereof; wherein the non-woven fibrous web has at least one major surface processed to form a layer that is densified relative to a remaining portion of the non-woven fibrous web.

In a fifth aspect, a non-woven fibrous web is provided, comprising: a plurality of melt-blown fibers comprising at least one thermoplastic semi-crystalline polymer, wherein the at least one thermoplastic semi-crystalline polymer does not contain a heterogeneous inclusion in an amount effective to achieve nucleation, and further wherein the non-woven fibrous structure is dimensionally stable and exhibits a Shrinkage less than 15%; wherein the non-woven fibrous web has at least one major surface processed to form a layer that is densified relative to a remaining portion of the non-woven fibrous web.

In a sixth aspect, a non-woven fibrous web is provided, comprising: a plurality of fibers comprising an amorphous polymer; and wherein the non-woven fibrous web has at least one major surface processed to form a layer that is densified relative to a remaining portion of the non-woven fibrous web.

In an seventh aspect, a three-dimensional shaped article is provided which is made from a provided non-woven fibrous web.

In a eighth aspect, a method of selectively densifying a non-woven fibrous web is provided, comprising: locally heating opposing major surfaces of an amorphous non-woven fibrous web to an annealing temperature to produce, within the non-woven fibrous web, top and bottom layers that are semi-crystalline and an intermediate layer that remains amorphous; optionally allowing the web to cool; heating the entire non-woven fibrous web to a processing temperature greater than the annealing temperature; and compressing the entire non-woven fibrous web whereby the amorphous intermediate layer densifies while the semi-crystalline top and bottom layers do not.

In a ninth aspect, a method of making a three-dimensional shaped article is provided, comprising: providing a non-woven fibrous web comprising a plurality of fibers comprising at least one thermoplastic semi-crystalline polymer; and thermally molding the non-woven fibrous web to obtain the three-dimensional shaped article to form a layer along at least one major surface of the non-woven fibrous web that is densified relative to a remaining portion of the non-woven fibrous web.

BRIEF DESCRIPTION OF THE DRAWINGS

As provided herein.

Figure 1:
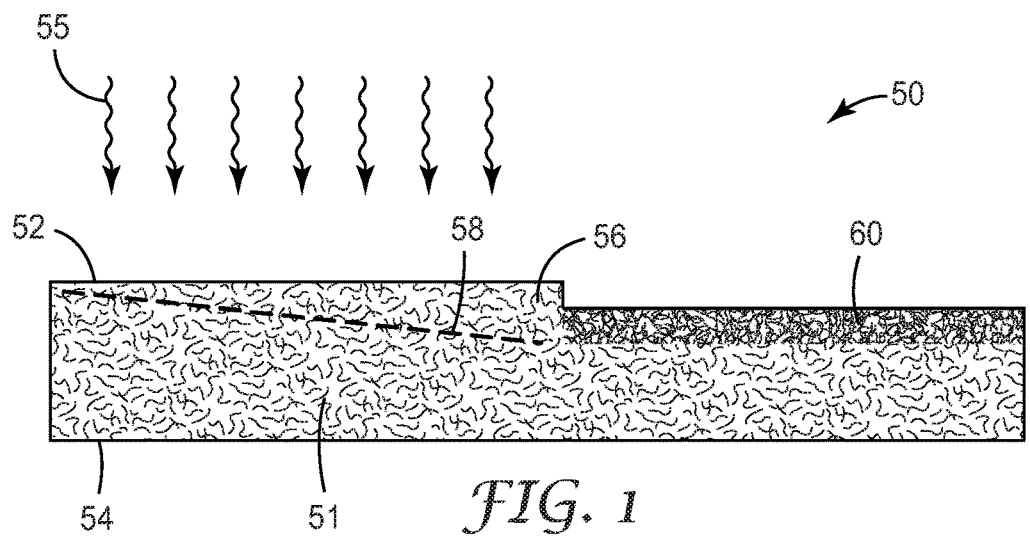
FIG. 1 is an elevational cross-sectional view showing an exemplary process for making a non-woven fibrous web.

Repeated use of reference characters in the specification and drawings is intended to represent the same or analogous features or elements of the disclosure. Other modifications and embodiments can be devised by those skilled in the art, which fall within the scope and spirit of the principles of the disclosure. The figures may not be drawn to scale.

Definitions

"Basis Weight" is calculated as the weight of a 10 cm×10 cm web sample multiplied by 100, and is expressed in grams per square meter (gsm).

"Copolymer" refers to polymers made from repeat units of two or more different polymers and includes random, block and star (e.g. dendritic) copolymers.

"Dimensionally stable" refers to a structure that substantially holds its shape under gravity unassisted (i.e., not floppy).

"Die" means a processing assembly including at least one orifice for use in polymer melt processing and fiber extrusion processes, including but not limited to melt-blowing.

"Discontinuous" when used with respect to a fiber or plurality of fibers means fibers having a limited aspect ratio (e.g., a ratio of length to diameter of e.g., less than 10,000).

"Enmeshed" means that particles are dispersed and physically held in the fibers of the web.

"Glass transition temperature (or $T_g$)" of a polymer refers to a temperature at which there is a reversible transition in an amorphous polymer (or in an amorphous region within a semi crystalline polymer) from a hard and relatively brittle "glassy" state into a viscous or rubbery state as the temperature is increased.

"Median fiber diameter" of fibers in a non-woven fibrous web is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Melting temperature (or $T_m$)" for a polymer represents the temperature at which a polymer changes state from a solid to a liquid, and can be determined as the peak maximum of a first-heat total-heat flow plot obtained using modulated differential scanning calorimetry, occurring in the melting region of the polymer or fiber if there is only one maximum in the melting region; and, if there is more than one maximum indicating more than one melting point (e.g., because of the presence of two distinct crystalline phases), as the temperature corresponding to the highest-amplitude melting peak.

"Non-woven fibrous web" means a plurality of fibers characterized by entanglement or point bonding of the fibers to form a sheet or mat exhibiting a structure of individual fibers or filaments which are interlaid, but not in an identifiable manner as in a knitted fabric.

"Oriented" when used with respect to a fiber means that at least portions of the polymer molecules within the fibers are aligned with the longitudinal axis of the fibers, for example, by use of a drawing process or attenuator upon a stream of fibers exiting from a die.

"Particle" refers to a small distinct piece or individual part of a material in finely divided form. A particle may also include a collection of individual particles associated or clustered together in finely divided form. Thus, individual particulates used in certain exemplary embodiments of the present disclosure may clump, physically intermesh, electrostatically associate, or otherwise associate to form particulates. In certain instances, particulates in the form of agglomerates of individual particulates may be formed as described in U.S. Pat. No. 5,332,426 (Tang et al).

"Polymer" means a relatively high molecular weight material having a molecular weight of at least 10,000 g/mol.

"Porous" means air-permeable.

"Shrinkage" means reduction in the dimension of a fibrous non-woven web after being heated to 150° C. for 7 days based on the test method described in U.S. Patent Publication No. 2016/0298266 (Zillig et al.);

"Size" refers to the longest dimension of a given object or surface.

"Substantially" means a majority of, or mostly, as in an amount of at least 50%, 60, 70, 80, 90, 95, 96, 97, 98, 99, 99.5, 99.9, 99.99, or 99.999%, or 100%.

"Volumetric Density" is the mass per unit volume of a non-woven fibrous web.

DETAILED DESCRIPTION

Objects and advantages of this disclosure are further illustrated by the following non-limiting examples, but materials and amounts thereof recited in these examples, as well as other conditions and details, should not be construed to unduly limit this disclosure. Herein, the terms "a", "an", and "the" include plural referents unless the content clearly indicates otherwise. The conjunction "or" is generally employed in its sense including "and/or" unless it is clearly indicated otherwise.

Described herein are non-woven fibrous webs, articles and assemblies thereof, and methods thereof that may be suitable for thermal and acoustic insulation. Further applications for these materials include filtration media, surgical drapes, and wipes, liquid and gas filters, garments, and personal protection equipment.

The fibers present in the non-woven fibrous webs can be made using any suitable method. Suitable methods include melt blowing and melt spinning, each of which are described in more detail below.

Melt blowing is one process useful in forming non-woven fibrous webs of thermoplastic polymeric fibers. In a melt-blowing process, one or more thermoplastic polymer streams are extruded through a die containing closely arranged orifices and attenuated by convergent streams of hot air at high velocities to form fine fibers. These fine fibers can be collected on a surface to provide a melt-blown non-woven fibrous web.

Depending on the operating parameters chosen, e.g., degree of solidification from the molten state, the collected fibers may be semi-continuous or essentially discontinuous. In certain exemplary embodiments, the melt-blown fibers of the present disclosure may be oriented on a molecular level. The fibers can be interrupted by defects in the melt, crossing of formed filaments, excessive shear due to turbulent air used in attenuating the fibers or other events occurring in the formation process. They are generally understood to be as semi-continuous or having the length much longer than the distance between fiber entanglements so that individual fibers cannot be removed from the fiber mass intact end-to-end.

Alternatively, non-woven fibrous webs can be made through the process of melt spinning, where fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt spun fibers are collected as a fibrous web and optionally subjected to one or more bonding operations to fuse the fibers to each other. Melt-spun fibers are generally larger in diameter than melt-blown fibers.

The melt-blown or melt-spun fibers of the non-woven fibrous web can have any suitable diameter. The fibers can have a median diameter of from 0.1 micrometers to 10 micrometers, from 0.3 micrometers to 6 micrometers, from 0.3 micrometers to 3 micrometers, or in some embodiments, less than, equal to, or greater than 0.1 micrometers, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 25, 27, 30, 32, 35, 37, 40, 42, 45, 47, or 50 micrometers.

As an option, at least some of the plurality of fibers in the non-woven fibrous web are physically bonded to each other. Conventional bonding techniques using heat and pressure applied in a point-bonding process or by smooth calendar rolls can be used, though such processes may cause undesired deformation of fibers or compaction of the web.

Other techniques for bonding the fibers is taught in, for example, U.S. Patent Publication No. 2008/0038976 (Berrigan et al.) and U.S. Pat. No. 7,279,440 (Berrigan et al.). One technique involves subjecting the collected web of fibers and fibers to a controlled heating and quenching operation that includes forcefully passing through the web a gaseous stream heated to a temperature sufficient to soften the fibers sufficiently to cause the fibers to bond together at points of fiber intersection, where the heated stream is applied for a time period too short to wholly melt the fibers, and then immediately forcefully passing through the web a gaseous stream at a temperature at least 50° C. less than the heated stream to quench the fibers.

In some embodiments, two different kinds of molecular phases are present within the fibers. For example, a predominantly semi-crystalline phase may co-exist with a predominantly amorphous phase. As another example, a predominantly semi-crystalline phase may co-exist with a phase containing domains of lower crystalline order (e.g., one in which the polymers are not chain-extended) and domains that are amorphous, the overall degree of order being insufficient for crystallinity. Such fibers can also be processed under heat as above to form a non-woven fibrous web.

In some embodiments of the non-woven fibrous web, the fibers do not substantially melt or lose their fiber structure during the bonding operation, but remain as discrete fibers with their original fiber dimensions.

In some embodiments, the fiber polymers in the non-woven fibrous webs display high glass transition temperatures, which is desirable for use in high temperature applications. Certain non-woven fibrous webs shrink significantly when heated to even moderate temperatures in subsequent processing or use, such as use as a thermal insulation material. Such shrinkage has been shown to be problematic when the melt-blown fibers include thermoplastic polyesters or copolymers thereof, and particularly those that are semi-crystalline in nature.

In some embodiments, the provided non-woven fibrous webs have at least one densified layer adjacent to a layer that is not densified. Advantageously, the densified layer and adjacent non-densified layer can be prepared from a unitary layer of non-woven fibrous web having a uniform density. The provided methods can, if desirable, provide a densified layer that has a uniform distribution of polymeric fibers throughout the layer. Alternatively, the distribution of polymeric fibers can be intentionally made non-uniform across a major surface of the non-woven fibrous web, whereby the acoustic response can be tailored based on its location along the major surface.

In some embodiments, the median fiber diameters of the densified and non-densified portions of the non-woven fibrous web are substantially the same. This can be realized, for example, by way of a process capable of fusing the fibers to each other in the densified region without significant melting of the fibers. Avoidance of melting the fibers can preserve the acoustic benefit that derives from the high surface area produced within the densified layer of the non-woven fibrous web.

Overall, the provided non-woven fibrous webs display numerous advantages, some of which are unexpected. These materials can be used in thermal and acoustic insulation applications at high temperatures where conventional insulation materials would thermally degrade or fail. Particularly demanding are automotive and aerospace vehicle applications, where insulation materials operate in environments that are not only noisy but can reach extreme temperatures.

The provided non-woven webs can resist shrinkage at temperatures as high as 150° C. or greater, as might be encountered in automotive and aerospace applications. Shrinkage can result from crystallization during heat exposure or processing, and is generally undesirable because it can degrade acoustic performance and impact the structural integrity of the product. The provided non-woven fibrous webs can exhibit a Shrinkage after being heated to 150° C. for 7 days, as measured using the Shrinkage test method described in U.S. Patent Publication No. 2016/0298266 (Zillig et al.), of less than 15%, 14%, 13%, 12%, 11%, 10%, 9%, 8%, 7%, 6%, 5%, 4%, 3%, 2% or 1%. Such Shrinkage values can apply along both the machine and cross-web directions.

As a further advantage, the densified layer can enable the non-woven fibrous webs to be thermally molded into three-dimensional structures that are dimensionally stable. Articles and assemblies based on such structures can be shaped to fit substrates having customized three-dimensional shapes. Customizing the shape of the article or assembly for a particular application optimizes use of space and simplifies attachment to, for example, an automotive or aerospace component. Because these shaped structures are dimensionally stable, these articles and assemblies also reduce the risk of de-lamination compared with conventional acoustic and thermal insulation products, which have a tendency to spring back to their original, relaxed configuration.

Yet another advantage relates to the ability to make non-woven fibrous webs that not only operate at high temperatures and are dimensionally stable but are also retain a high density of surface area within both densified and non-densified portions of the web. Retention of high surface area provided by the fibers enables even a very small weight of material to accomplish a high level of performance as an acoustic absorber. Surface area is relevant because the ability of the non-woven fibrous web to dissipate noise is based on viscous dissipation at the fiber surfaces, where kinetic energy of sound pressure waves is converted into heat. As mentioned previously, weight savings can drive improved fuel efficiency in automotive and aerospace vehicles.

Finally, because these fibrous webs are made from a single layer, fewer processing and web handling steps are necessary compared with processes used to manufacture articles containing multiple layers. Reducing the number of layers in the end product, while preserving its performance properties, enables the product to be made more simply and at a reduced manufacturing cost.

Thermoplastic Polymers

Non-woven fibrous structures or webs of the present disclosure contain at least one thermoplastic polymer. The provided non-woven fibrous webs generally contain at least 35% by weight of one or more thermoplastic polymers. In various embodiments, the amount of thermoplastic polymer in the fibers may be less than, equal to, or greater than 35, 40, 45, 50, 55, 60, 65, 70, 75, 80, 85, 90, 95, or 99% by weight relative to the overall weight of the fibers in the non-woven fibrous web.

Exemplary thermoplastic polymers generally include polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a copolymer or blend thereof.

In some embodiments, one or more of the thermoplastic polymers are amorphous—i.e., the polymer has essentially zero crystallinity. Optionally, some or all of the fibers in the provided non-woven fibrous web are made exclusively from thermoplastic polymers that are amorphous.

Exemplary thermoplastic polymers that are amorphous include polycarbonate, polystyrene, polyetherimide, polyethylene terephthalate glycol, acrylonitrile butadiene styrene copolymer, ethylene butylene styrene copolymer, and cyclic olefins, along with copolymers and blends thereof.

In some embodiments, the at least one thermoplastic polymer includes a semi-crystalline polymer. Semi-crystalline polymers include aliphatic polymers and aromatic polymers.

In some embodiments, the semi-crystalline polymer includes an aromatic polyester. In certain exemplary embodiments, the aromatic polyester includes polyethylene terephthalate, polyethylene terephthalate glycol, polybutylene terephthalate, polytrimethylene terephthalate, polyethylene napthalate, liquid crystal polyester, or a copolymer or blend thereof. The thermoplastic semi-crystalline polymer can optionally include a blend of a polyester and at least one other polymer.

In other embodiments, the semi-crystalline polymer includes an aliphatic polyester. Useful aliphatic polyesters include homo- and copolymers of poly(hydroxyalkanoates) and homo- and copolymers of those aliphatic polyesters derived from the reaction product of one or more polyols with one or more polycarboxylic acids formed from the reaction product of one or more alkanediols with one or more alkanedicarboxylic acids (or acyl derivatives). Polyesters may be derived from multifunctional polyols, e.g. glycerin, sorbitol, pentaerythritol, and combinations thereof, to form branched, star, and graft homo- and copolymers. Miscible and immiscible blends of aliphatic polyesters with one or more additional semicrystalline or amorphous polymers may also be used.

Exemplary aliphatic polyesters that are also semi-crystalline include polylactic acid, polyglycolic acid, poly(lactic-co-glycolic acid), polybutylene succinate, polyhydroxybutyrate, polycaprolactone, polyhydroxyvalerate, polyhydroxyalkanoates, polyglycolide, polybutylene succinate, poly(3-hydroxybutyrate-co-3-hydroxyvalerate) and polyethylene adipate, and blends and copolymers thereof.

Polyhydroxyalkanoates are derived by condensation or ring-opening polymerization of hydroxy acids, or derivatives thereof. Polyhydroxyalkanoates can be represented by the formula:

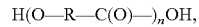

H(O—R—C(O)—)$_n$OH, where R is an alkylene moiety that may be linear or branched having 1 to 20 carbon atoms, preferably 1 to 12 carbon atoms optionally substituted by catenary (bonded to carbon atoms in a carbon chain) oxygen atoms; n is a number such that the ester is polymeric, and is preferably a number such that the molecular weight of the aliphatic polyester is at least 10,000, preferably at least 30,000, and most preferably at least 50,000 g/mol. R may further comprise one or more in-chain ether oxygen atoms. Generally, the R group of the hydroxy acid is such that the pendant hydroxyl group is a primary or secondary hydroxyl group.

Further details on thermoplastic polymers useful for making non-woven fibrous webs can be found in, for example, U.S. Pat. No. 7,757,811 (Fox et al.) and U.S. Pat. No. 9,194,065 (Moore et al.).

In some embodiments, the fibrous web is comprised of a thermoplastic polyamide. Polyamides include aliphatic polyamides, in which the main chain contains primarily aliphatic groups. Examples of such polyamides include nylon 6 and nylon 6,6. Other examples of polyamides include polypthalamides, wherein the main chain contains primarily semi-aromatic groups, and aramids (aromatic polyamides), in which the main chain contains primarily aromatic groups. Examples of such polyamides include copolymers of paraphenylenediamine and terephthalic acid.

High molecular weight polymers can provide fibers with good mechanical properties, but such polymers also tend to display high melt viscosities, which can complicate their processing. Molecular weights for useful aliphatic polyester can be in the range of from 15,000 g/mol to 6,000,000 g/mol, from 20,000 g/mol to 2,000,000 g/mol, from 40,000 g/mol to 1,000,000 g/mol, or in some embodiments, less than, equal to, or greater than 15,000 g/mol; 20,000; 25,000; 30,000; 35,000; 40,000; 45,000; 50,000; 60,000; 70,000; 80,000; 90,000; 100,000; 200,000; 500,000; 700,000; 1,000,000; 2,000,000; 3,000,000; 4,000,000; 5,000,000; or 6,000,000 g/mol.

Heterogeneous Inclusions

Modification of the crystallization behavior can be used to balance the ease of fiber processing upon heating with having a reasonable rate of fiber solidification in web formation. Such modification can also be used to reserve a level of amorphous content allowing the web to be softened in subsequent processing. These modifications may allow for improved properties desired in some applications or make processing of the web easier or more robust. Certain agents added to the fibers to hasten or retard this process are referred to heterogeneous inclusions.

In some embodiments, advantageous properties are imparted to the non-woven fibrous web through use of fibers that contain one or more heterogeneous inclusions, as described in U.S. Pat. No. 9,487,893 (Moore et al). Heterogeneous inclusions are microscopic and at least partially phase separated from primary fiber components. In a preferred embodiment, the heterogeneous inclusions are evenly distributed throughout the fibers. The one or more heterogeneous inclusions may, for example, include aggregates of a polyolefin such as polypropylene.

In some embodiments, heterogeneous inclusions are obtained by blending the polymeric fiber component with polypropylene in an amount greater than 0% and no more than 10% by weight of the web, before or during extrusion. Advantageously, incorporating heterogeneous inclusions into the fibers can provide non-woven fibrous webs that have at least one dimension which decreases by no greater than 10% in the plane of the web, when the web is heated to a temperature above a glass transition temperature of the fibers.

In preferred embodiments, the provided non-woven fibrous webs may be heated 15° C., 20° C., 30° C., 45° C. and even 55° C. above the glass transition temperature of the polymeric fiber material(s), and the non-woven fibrous web can remain dimensionally stable, e.g., having at least one dimension which decreases by no greater than 10% in the plane of the web.

In some embodiments, aggregates of polypropylene are evenly distributed within a polyester fiber, wherein the polypropylene acts as a selectively miscible additive. At relatively small loadings, polypropylene can mix with polyester and physically inhibit chain movement. Inhibiting chain movement in turn can suppress cold crystallization and reduce the extent of macroscopic shrinkage. If the amount polypropylene present is increased significantly beyond 10% by weight, the polypropylene and polyester phase separate and rearrangement of the polyester is not affected.

Alternatively, the heterogeneous inclusions may be comprised of one or more other thermoplastic semicrystalline polymers, including polyoxymethylene, poly(vinylidine fluoride), poly(ethylene-chlorotrifluoroethylene), poly(vinyl fluoride), poly(ethylene oxide), polycaprolactone, semicrystalline aliphatic polyamides, and thermotropic liquid crystal polymers.

The thermoplastic semicrystalline polymer may have any suitable molecular weight enabling it to remain heterogeneous in the fibers at operating temperatures for the end use article or assembly. For instance, the thermoplastic semicrystalline polymer can be a weight average molecular weight of less than, equal to, or greater than 10,000 g/mol, 15,000 g/mol, 20,000 g/mol, 25,000 g/mol, 30,000 g/mol, 35,000 g/mol, 40,000 g/mol, 45,000 g/mol, 50,000 g/mol, 55,000 g/mol, 60,000 g/mol, 65,000 g/mol, or 75,000 g/mol. The heterogeneous inclusions can have overall dimensions that facilitate nucleation of polymer crystallization in the fibers of the non-woven fibrous web. The heterogeneous inclusions can have an average size (as a percentage of fiber diameter) that is from 0.001% to 7%, from 0.01% to 7%, from 0.01% to 3%, or in some embodiments, less than, equal to, or greater than 0.001%, 0.002, 0.005, 0.007, 0.01, 0.02, 0.05, 0.07, 0.1, 0.2, 0.5, 0.7, 1, 1.2, 1.5, 1.7, 2, 2.5, 3, 3.5, 4, 4.5, 5, 5.5, 6, 6.5, 7, 7.5, 8, 8.5, 9, 9.5, or 10% of the median diameter of the plurality of fibers in the non-woven fibrous web.

The heterogeneous inclusions can be present in an amount that provides a desirable population of nucleation sites in the fibers. A suitable concentration of nucleation sites can yield an overall higher percentage of crystalline material in the fibers while reducing cycle time during processing of the non-woven web and increasing manufacturing efficiency. The heterogeneous inclusions can have an average size that is from 0.01% to 3% by weight, from 0.01% to 10% by weight, from 0.1% to 4% by weight, or in some embodiments, less than, equal to, or greater than 0.01%, 0.02, 0.05, 0.07, 0.1, 0.2, 0.5, 0.7, 1, 1.2, 1.5, 1.7, 2, 2.5, 3, 3.5, 4, 4.5, 5, 5.5, 6, 6.5, 7, 7.5, 8, 8.5, 9, 9.5, or 10%, relative to the overall weight of the non-woven fibrous web.

While heterogeneous inclusions can be advantageous in some embodiments, they need not be present in others. For example, it is possible to avoid crystallization-induced shrinkage of the non-woven fibrous web by elimination of nucleation sites to form fewer, larger crystallites. In this alternative approach, the provided non-woven fibrous web contains fibers made from a thermoplastic polymer that does not contain heterogeneous inclusions in an amount effective to achieve nucleation. Reducing the number of "seeds" in the thermoplastic polymer that facilitate crystallization can provide a non-woven web having increased thermal stability and significantly reduced heat shrinkage. In some embodiments, the manufacturing process for these fibers further includes an in-flight annealing process, as described in a forthcoming section ("Methods of making articles and assemblies").

Additives

The provided non-woven fibrous webs optionally include one or more additives. Additives may be homogenous or heterogenous, and can represent components enmeshed in the fibers of the non-woven structure or incorporated into or onto the fibers themselves. Solid additives can take any shape—e.g., spheres, flakes, rods, or fibers—or may assume an irregular shape.

In some embodiments, one or more additional fiber populations are incorporated into the non-woven fibrous web. Fiber populations can differ from each other based on their composition, median fiber diameter, and/or median fiber length.

It can be advantageous to have fibers of different diameters. For example, a non-woven fibrous web can include a plurality of first fibers having a median diameter of less than 10 micrometers and a plurality of second fibers having a median diameter of at least 10 micrometers. Inclusion of the thicker second fibers can improve the resiliency of the non-woven fibrous web, crush resistance, and help preserve the overall loft of the web. The second fibers can be made from any of the polymeric materials previously described with respect to the first fibers and may be made from a melt-blown or melt spun process.

The second fibers can have any suitable fiber diameter to provide desirable mechanical, acoustic, and/or thermal properties. For example, the plurality of second fibers can having a median diameter of at least 10 micrometers, from 10 micrometers to 60 micrometers, from 20 micrometers to 40 micrometers, or in some embodiments, less than, equal to, or greater than 10 micrometers, 11, 12, 13, 14, 15, 16, 17, 18, 19, 20, 22, 25, 27, 30, 32, 35, 37, 40, 45, 50, 55, or 60 micrometers.

Optionally, either or both of the first and second fibers are oriented. Oriented fibers are fibers that show significant alignment on the molecular scale. Fully oriented and partially oriented polymeric fibers are known and commercially available. Orientation of fibers can be measured in any of a number of ways, including birefringence, heat shrinkage, X-ray scattering, and elastic modulus (see e.g., Principles of Polymer Processing, Zehev Tadmor and Costas Gogos, John Wiley and Sons, New York, 1979, pp. 77-84). Orientation of fibers in the non-woven fibrous web can be achieved using any known method.

In some embodiments, the second fibers are staple fibers that are interspersed with the first plurality of the fibers. The staple fibers can include binder fibers and/or structural fibers. Binder fibers include, but are not limited to, any of the above-mentioned polymeric fibers. Suitable structural fibers can include, but are not limited to, any of the above-mentioned polymeric fibers, as well as inorganic fibers such as ceramic fibers, glass fibers, and metal fibers; and organic fibers such as cellulosic fibers. The blending of these staple fibers into the non-woven web is sometimes referred to as carding.

Additional options and advantages associated with combinations of the first and second fibers are described, for example, in U.S. Pat. No. 8,906,815 (Moore et al.).

Other heterogeneous additives can be incorporated into the non-woven fibrous web to increase the internal surface area of the structure. Useful additives include high surface area fillers such as natural fibers, recycled fibers, recycled foams, and recycled films. These additives can have a median particle size of from 5 micrometers to 500,000 micrometers, from 10 micrometers to 100,000 micrometers, from 30 micrometers to 50,000 micrometers, or in some embodiments less than, equal to, or greater than 5 micrometers, 10; 15; 20; 25; 30; 35; 40; 45; 50; 60; 70; 80; 90; 100; 150; 200; 250; 300; 350; 400; 450; 500; 600; 700; 800; 900; 1000; 1100; 1200; 1300; 1400; 1500; 2000; 2500; 3000; 3500; 4000; 4500; 5000; 6000; 7000; 8000; 9000; 10,000; 20,000; 30,000; 40,000; 50,000; 100,000; 200,000; 300,000; 400,000; or 500,000 micrometers.

Besides the heterogeneous additives specifically described above, any number of other additives can be added to the fiber melt and extruded to incorporate the additive into the fiber. Extrudable additives may be solid or liquid at ambient conditions and can include fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluorochemicals. If heterogenous, such additives may be enmeshed in the fibers.

Additives can be present in an amount of from 0.001% to 13%, from 0.1% to 10%, from 0.2% to 5%, or in some embodiment, less than, equal to, or greater than 0.001%, 0.002, 0.003, 0.004, 0.005, 0.01, 0.02, 0.03, 0.04, 0.05, 0.1, 0.2, 0.3, 0.4, 0.5, 1, 2, 3, 4, 5, 6, 7, 8, 9, 10, 11, 12, or 13% by weight, relative to the overall weight of the non-woven fibrous web.

Methods of Making Articles and Assemblies

Methods of making the provided non-woven fibrous webs are described here by reference to the layered construction shown in FIG. 1.

A non-woven fibrous precursor web is shown in FIG. 1 and herein referred to by the numeral 50. The precursor web 50 is comprised of a multiplicity of entangled polymeric fibers, such as described above. In this figure, the precursor web 50 is shown in various stages of its processing, from an undensified product on the left side to a partially densified product on the right side.

The precursor web 50 has opposing major surfaces—top and bottom surfaces 52, 54. In an exemplary method, heat is conveyed to the top surface 52 of the precursor web 50 to raise the temperature of some fibers to a processing temperature. Typically, the processing temperature is above both the glass transition temperature ($T_g$) of the polymer fibers and above their melting temperature ($T_m$) where the fibers are comprised of a semi-crystalline polymer.

In a preferred embodiment, the processing temperature is sufficient to melt essentially all of the polymer crystallites present in the fibers of the precursor web 50 such that the polymer fibers are amorphous when in equilibrium at that temperature, but not to the extent that the fibers liquefy and lose their form.

For polymers that crystallize readily, the web can be processed at a temperature in a range between the glass transition temperature of the polymer representing the bulk of the fiber and the melting point maximum for the polymer representing the bulk of the fiber. For exemplary fiber polymers, the processing temperature can be, for example, from $T_g$ to $T_m+30°$ C., from $T_g+45°$ C. to $T_m+15°$ C., from $T_g+60°$ C. to $T_m+10°$ C., or from $T_g+75°$ C. to $T_m+5°$ C.

For polymers that do not crystallize or crystallize very slowly, the processing temperature for the web is preferably above the polymer glass transition temperature but not so high that the fibers of the web fully melt, or "film out." In some embodiments, the processing temperature can be from $T_g+15°$ C. to $T_g+100°$ C., from $T_g+30°$ C. to $T_g+80°$ C., or from $T_g+40°$ C. to $T_g+60°$ C.

Overall, the processing of the precursor web 50 can take place at a temperature of less than, equal to, or greater than 100° C., 110, 120, 130, 140, 150, 160, 170, 180, 190, 200, 220, 250, 270, 300, 320, 350, 370, 400, 420, 450, 470, or 500° C.

The heating of the fibers is accomplished with the assistance of a heat source 55. As an example, the fibers of the precursor web 50 can be heated by directing a stream of heated air, or other gas, toward the top surface 52 as shown. Alternatively, or in combination, the heat may be conveyed to the web by placing the top surface 52 in contact with a heated surface. In a continuous process, for example, the top surface 52 could contacted with a heated roller. As a further alternative, it is possible to convey heat to the fibers of the precursor web 50 by exposing to radiation, such as infrared radiation.

The result of applying heat in the manner above is the formation of a heat penetration zone 56. The depth of the heat penetration zone 56 is shown by the dotted line 58, and reflects the portion of the precursor web 50 in which fibers therein are at or above their processing temperature. As shown in FIG. 1, the depth of the heat penetration zone 56 increases with increasing time of exposure to the source of heat.

In a next step, the pressure is applied to densify the fiber layer within the heat penetration zone 56 to produce a densified layer 60 as also shown in FIG. 1. In an exemplary continuous process, pressure is applied using roller, which may or may not be heated. In a batch process, pressure can be applied using a metal tool, which again may or may not be heated. The roller or tool may be configured to form a planar surface on the densified layer 60, as shown, or may be shaped to form the densified layer into a more complex three-dimensional shape.

Where both the web and the tool are heated, it can be advantageous for the temperature of the web to be raised to a preliminary temperature between the glass transition temperature and the melting temperature of a semi-crystalline fiber polymer, yet below the temperature of the tool used for subsequently molding the web into a three-dimensional shape. It was found that this two-tiered heating process can provide for a more open web structure and improved acoustic absorption.

The degree of densification need not be particularly restricted, and can vary depending on the period over which the pressure is applied, and the temperature profile of the fibers during that period.

Optionally but not shown, a densified layer (such as densified layer 60) may be formed on both sides of the precursor web 50 by conveying heat to both the top and bottom surfaces 52, 54 of the precursor web 50 and applying pressure to the heated fibers to both surfaces 52, 54, thereby forming densified layers on both major surfaces.

In some embodiments, sufficient heat and pressure cause the penetration zone 56 to span the entire thickness of the precursor web 50. When this occurs, the result can be a single densified layer extending from the top surface 52 to the bottom surface 54. As will be later discussed, such a configuration further increases the density and strength of the non-woven fibrous web and can be useful for edge sealing of the end product.

After the densification process has been completed, the provided non-woven fibrous web can represent a finished or semi-finished article. If semi-finished, further processing of the web may follow in the same or a subsequent operation.

For example, the web may be laminated or otherwise attached to other layers or structures to form a useful assembly, or undergo a further heat treatment, converting, or trimming process (such as a die-cutting process). The non-woven fibrous web may also be molded into a pre-determined three-dimensional shape for a specific application, as will be described later.

To manipulate the microstructure of the fibers and to enable complex multilayered configurations, the non-woven fibrous web can be subjected to various heat treatments, each characterized by parameters such as time, temperature, and mode of application to the web. Heat treatments that may be applied to a fibrous non-woven web include, for example, annealing, softening, and flash annealing.

In an annealing process, fibers are heated and retained at an annealing temperature above the glass transition temperature but below the melting temperature of the fiber material. The time over which the annealing takes place can be sufficient to allow a significant degree of polymer crystallization to occur in the fiber material. This time can be more than 1 second, more than 5 seconds, more than 10 seconds, or in some embodiments, less than, equal to, or greater than 1 second, 2, 3, 4, 5, 6, 7, 8, 9, or 10 seconds. The annealing process may be applied to the entire non-woven fibrous web or locally to only a layer of the non-woven fibrous web extending along one or both of its major surfaces.

With respect to melt-blown fibers, it can be possible to perform annealing in situ—for example, as the fibers are extruded from a melt-blowing die. Such a process can be useful to alter the crystallization behavior and average crystallite size for slow-crystallizing materials such as PET and PLA.

Annealed fibers made from a thermoplastic material that lacks a significant concentration of nucleating agents can provide a web exhibiting enhanced stability and reduced heat shrinkage. This benefit can derive from delaying crystallization during subsequent heat exposure or processing and/or stronger polymer chain-chain alignment generated by the reduction in the level of crystalline nuclei present in the polymer. In situ reduction in the number and/or increase in the size of crystal nuclei can result in a nonwoven fibrous web that has a relatively low level of crystallinity and resists shrinkage at higher temperatures, particularly when heated to a temperature at or above the glass transition temperature but below the melting temperature of the polymeric fiber material.

The annealing temperature for a thermoplastic polymer can be from 100° ° C. to 500° C., from 125° C. to 350° C., from 150° ° C. to 300° C., or in some embodiments, less than, 5 equal to, or greater than 80° C., 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 450, or 500° C. In some embodiments, the fibers are annealed using an in-flight heat treatment operation at a temperature below a melting temperature of the portion of the first fibers to achieve stress relaxation of at least a portion of molecules within a portion of the first fibers. Further technical details concerning in-flight heat treatment are described in U.S. Patent Publication No. 2016/0298266 (Zillig et al.).

In a softening process, fibers are heated and retained at a softening temperature that is above the glass transition temperature but below the melting temperature of the fiber material. Softening temperatures can be similar or identical to annealing temperatures, but the period over which the softening takes place is preferably insufficient for a significant degree of polymer crystallization to occur in the fiber material. This period can be less than 100 milliseconds, less than 50 milliseconds, less than 10 milliseconds, or in some embodiments, less than, equal to, or greater than 10 milliseconds, 20, 30, 40, 50, 60, 70, 80, 90, or 100 milliseconds. Like annealing, the softening process may be applied through the thickness of the entire non-woven fibrous web or locally to only a layer of the non-woven fibrous web extending along one or both of its major surfaces.

Processing of the non-woven fibrous web generally occurs simultaneously with, or immediately after, the softening process above. Processing, in this context, includes densification of the non-woven fibrous web as well as thermal molding or shaping of the non-woven fibrous web into a three-dimensional shape.

In a flash annealing process, fibers are heated to a flash annealing temperature well above both the glass transition temperature and the melting temperature of the fiber material then cooled rapidly. The fibers are thus rendered fully amorphous, then quenched in their amorphous state before crystallites have sufficient time to form. To avoid re-crystallization, the fibers are preferably cooled below their glass transition temperature within a fraction of a second. The amount of time at which the fibers are above their glass transition temperature can be less than 0.5 milliseconds, less than 10 milliseconds, less than 50 milliseconds or, in some embodiments, less than, equal to, or greater than 1 millisecond, 2, 3, 4, 5, 6, 7, 8, 9, 10, 15, 20, 25, 30, 35, 40, 45, or 50 milliseconds. Flash annealing generally modifies only a surface layer of the non-woven fibrous web.

By eliminating undesirable crystallization, flash annealing can effectively reset the thermally moldable properties of the fibers such that they can be subsequently densified using the above process and/or thermally molded into a three-dimensional shape.

Layer Constructions

Various exemplary non-woven fibrous webs are illustrated in the provided figures, and can be optionally made using any of the methods described above. One exemplary non-woven fibrous web 100 is presented in FIG. 2. The web 100 has a unitary construction, with first and second opposing major surfaces 102, 104.

The web 100 is porous and has a multiplicity of entangled polymeric fibers. As shown, the web 100 has three layers—a top layer 106, intermediate layer 108, and bottom layer 110. The top and bottom layers 106, 110 extend along and define the opposing first and second major surfaces 102, 104, each layer being densified relative to the intermediate layer 108, which is not-densified.

The densified layers 106, 110 can provide significantly enhanced acoustic absorption properties. The densified layers 106, 110 can also provide significantly improved strength and tear resistance. Advantageously, the enhancement in strength and tear resistance can be uniform along all directions along the plane of the first and second major surfaces 102, 104. By comparison, such properties are difficult to achieve by reinforcing the non-woven web using a scrim, which tends to provide greater strength along the machine (or down-web) direction than in the cross-web direction.

As a further benefit, densification provides a layer of mechanical reinforcement that extends into the web along the thickness dimension of the web 100. The provided process enables the extent and depth of densification to be tailored by manipulating the temperature, time, and mode of heat application. Where, as here, both the first and second major surfaces are selectively densified, the overall web 100 is significantly stiffened. This stiffening occurs because the bending of the web would require the simultaneous stretching of one densified layer and compression of the opposing densified layer.

While not explicitly shown, it is to be understood that one of the top or bottom densified layers 106, 110 can be omitted, based on the application at hand.

Figure 3:
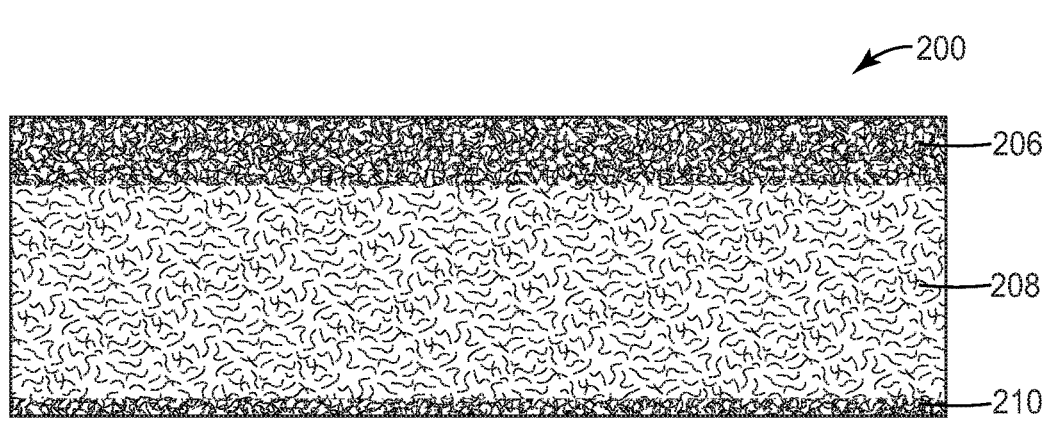

FIG. 3 shows a non-woven fibrous web 200 having similar characteristics to those of web 100, such as top, intermediate, and bottom layers 206, 208, 210, of which the top and bottom layers 206, 210 are densified layers. The web 200 is distinguished from web 100 in that the top layer 206 has a thickness significantly greater than that of the bottom layer 210.

In an exemplary method for making a web having a top and bottom densified layer, heated air is partly drawn through the web containing it in layer 206 to raise the temperature above the glass transition temperature at a rate and temperature that softens but does not melt the fibers in the region. The region is then compacted and layers 208, 210 allowed to rebound, leaving one compacted layer. The web can be treated in a similar manner on the bottom side to make a second densified layer. Alternatively, both layers 206, 210 can be heated and pressed simultaneously. The thickness of each region is controlled by heating rate and the depth of penetration into the web 200.

Figure 2:
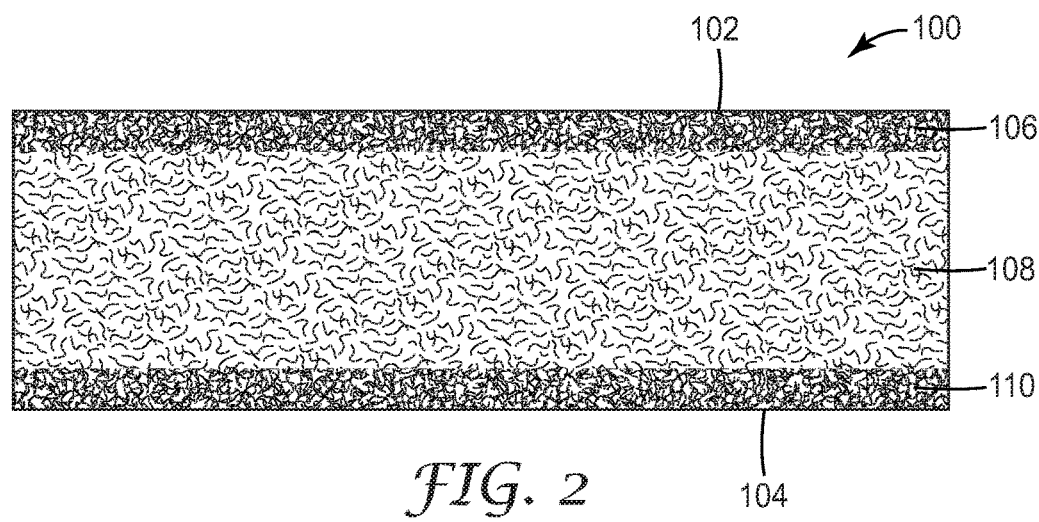
FIGS. 2-5 are elevational cross-sectional views of non-woven fibrous webs according to various exemplary embodiments.

Certain technical benefits of the asymmetric configuration in FIG. 2 derive from its ability to provide varying degrees of densification based on the needs of the application at hand. In the embodiment depicted in FIG. 2, the bottom layer 210 can have a short thickness and high density that provides a suitable gripping surface for handling and strength, while the top layer 206 can have an intermediate level of densification and greater thickness, thereby providing an optimized acoustic absorption at both high and low frequencies. Optionally, there is a density gradient (i.e., a more gradual change in density) between the densified and non-densified layers depicted in FIG. 2.

A densified layer in the web 300 having too high a density can cause high frequency sound pressure waves to bounce off the layer, instead of being absorbed and converted into heat energy. For this reason, it may be useful to orient the web 200 such that the top layer 206, which has intermediate density, is facing towards the source of noise to be attenuated.

Figure 4:
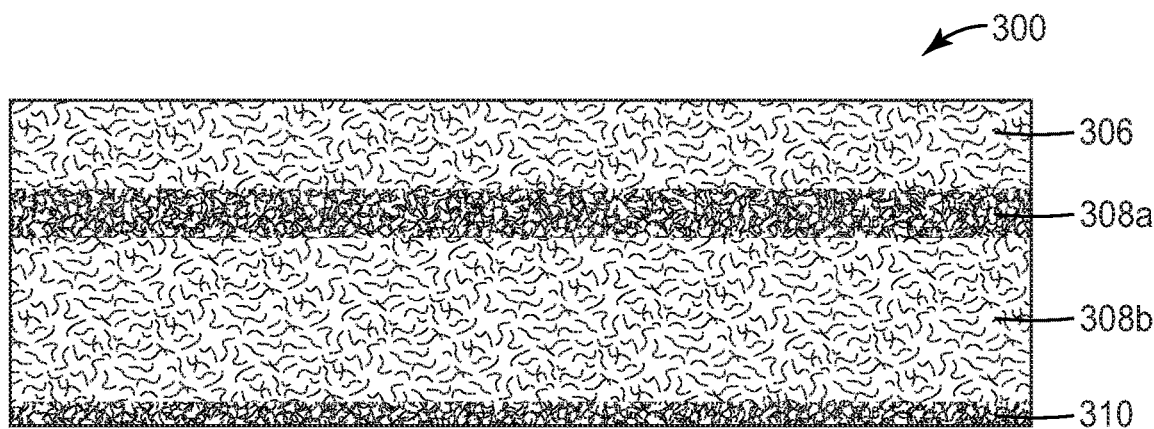

FIG. 4 shows a non-woven fibrous web 300 in which a densified intermediate layer 308a is embedded within the web 300. In this embodiment, the densified intermediate layer 308a is interposed between a pair of layers that are not densified—here, a non-densified top layer 306 and an internal non-densified intermediate layer 308b. Such a configuration can provide the web 300 with sound absorption at low frequencies, while also providing a relatively thin densified layer on both the top and bottom surfaces for increased stiffness, durability and easy handling of the web 300.

This web 300 can be made by annealing the top and bottom surfaces of the precursor web to crystallize only the polymer fibers proximate to the top and bottom surfaces of the web 300. After allowing the web to cool, heat is then applied throughout the entire web and compression applied to all layers at once. Since the intermediate layer 308a remains amorphous, it densifies under applied heat and pressure while the adjacent layers 306, 308b do not. The densified bottom layer 310 can then be formed by flash annealing and subsequently densifying only the bottom surface of the web 300.

As an alternative, the top layer 306 can be annealed to build up crystallinity in this surface layer, then in a second step, heated deeper than the top layer 306 through penetration of heated air from the same side and web 300 pressed to form the densified layer 308*a*. Then the web 300 can be heated from its bottom side and pressed a second time to form the densified layer 310.

Figure 5:
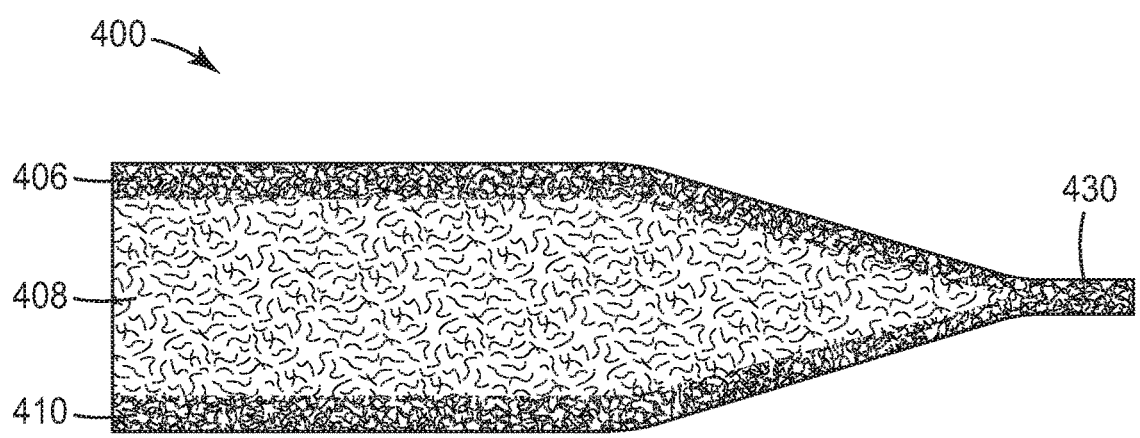

FIG. 5 shows a non-woven fibrous web 400 having an intermediate layer 408 that is not densified and top and bottom layers 406, 410 that are densified. One edge of the web 400 has been subjected to heat and pressure to provide a thermally edge sealed portion 430 as shown. The edge sealed portion 430 can be formed using an edge sealing process such as previously described.

Edge sealing can provide a section of the web 400 that is densified throughout its cross-section along the thickness dimension. The edge sealed section can extend along the periphery of the web 400, as shown in FIG. 5. Alternatively, an edge sealed section could be located along an interior region of the web (i.e., remote from the periphery of the web). The edge sealed portion 430 adds strength to the web 400 and facilitates handling and attachment of the web 400 to other articles.

Advantageously, edge sealed portions, such as edge sealed portion 430, can have sufficient stiffness and tear strength to provide attachment points for a mechanical fastener. In some embodiments, one or more mechanical fasteners are used to couple an edge sealed portion to an automotive or aerospace structure. Useful mechanical fasteners include, for example, "Christmas tree" push clips that pierce entirely through the edge sealed portion and into a mating receptacle on the opposite side of the fibrous non-woven web.

While FIGS. 1-5 show embodiments that are of a unitary construction—that is, derived from a single monolithic layer—articles and assemblies made from the provided non-woven fibrous webs need not be so restricted. In some embodiments, for example, one or more optional layers are disposed on one or both surfaces of the provided webs to provide additional functionality. Optional additional layers may include, for example, a scrim for providing enhanced chemical or stain resistance against dirt, gasoline, oil, antifreeze, transmission and brake fluids, soaps, and degreasing compounds. Heated air can be used to pre-heat the web and allow such a scrim to be bonded without need for an adhesive.

As a further option, two or more layers of the non-woven fibrous web described above could be laminated to each other under heat and pressure to provide thicker, multilayered constructions.

Figure 6:
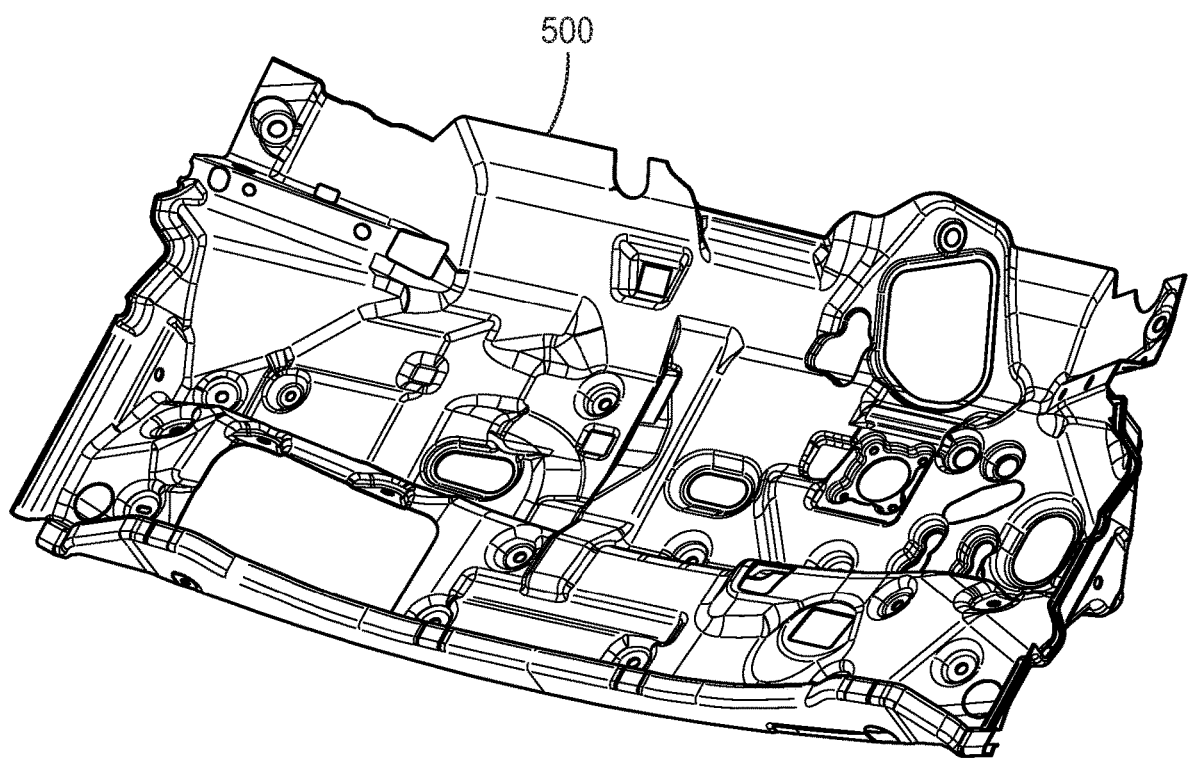
FIG. 6 is an isometric view showing a shaped article made from a non-woven fibrous web.

FIG. 6 shows a three-dimensional molded thermal acoustic padding 500 made from a provided non-woven fibrous web and customized to fit an automotive front-of-dash enclosure. The padding 500 is dimensionally stable, allowing the padding to be registered and installed into the enclosure without undue distortion of the article. Use of a fitted article, as here, enables better use of space and can reduce the number of fasteners needed to securement the padding 500 to the automobile.

The article 500 can be made by placing the non-woven fibrous web against a three-dimensional shaped tool. In some embodiments, the three-dimensional shaped tool is comprised of complementary shaped halves operatively coupled to a hydraulic or pneumatic press. Each half of the tool may or may not be heated. If no part of the tool is heated, the web can be pre-heated using any of the methods (e.g., conduction, heated air, infrared) previously described.

Optionally, the resulting three-dimensional molded article has a deep drawn shape in which the depth (z-axis) dimension approaches or exceeds one or both of its lateral (x- or y-axis) dimensions. In some embodiments, the depth dimension of the three-dimensional molded article is less than, equal to, or greater than 10%, 15, 20, 25, 30, 35, 40, 45, 50, 55, 60, 65, 70, 75, 80, 85, 90, 95, 100% of one or both lateral dimensions.

Three-dimensional molding of the non-woven fibrous webs may take place concurrently with, or after, formation of the densified layer. Competing technical advantages derive from each approach. For example, formation of the densified layer concurrently with the three-dimensional molding step reduces the overall number of processing steps, saving significant time and costs. Yet, doing so may cause the thickness of the densified layer to vary depending on the curvature of the mold surface. Formation of the densified layer prior to the three-dimensional molding step can provide a densified layer having greater uniformity in thickness along the surface of the molded product.

In some embodiments, the volumetric density and/or thickness of the densified layer varies significantly along a major surface of the non-woven fibrous web. For acoustic insulation applications, such differences in density can enable the acoustic response to vary by location along the molded article. The volumetric density of the densified layer at a first location can be 10%, 20, 30 40, 50, 60, 70, 80, 90, 100, 110, 120, 130, 140, 150, 160, 170, 180, 190, 200, 250, 300, 350, 400, 450, 500, 550, 600, 650, 700, 750, 800, 850, 900, 950, or 1000% greater than the volumetric density at a second location along the non-woven fibrous web. Likewise, the thickness of the densified layer at a first location can be 10%, 20, 50, 100, 200, 300, 400, 500, 700, 1000, 1500, 2000, 2500, 3000, 3500, 4000, 4500, or 5000% greater than the thickness of the densified layer at a second location along the non-woven fibrous web.

The mechanical strength of the non-woven fibrous web is preferably sufficient to prevent tearing during handling and installation. The provided webs can display an overall tensile strength (averaging the tensile strength along the machine and cross-web directions) of from 10 N to 100 N, from 20 N to 50 N, from 30 N to 40 N, or in some embodiments, less than, equal to, or greater than 10 N, 11, 12, 15, 17, 20, 22, 25, 27, 30, 32, 35, 37, 40, 42, 45, 47, or 50 N, when measured using the Grab Test ASTM D5034 (2017).

Advantageously, the provided webs can display a tensile strength that is relatively consistent when measured along different directions across the major surface of the web—a property difficult to achieve when reinforcing a non-woven fibrous web with a scrim. The provided webs can display, for example, a tensile strength along the machine direction no more than 10%, no more than 15%, no more than 20%, no more than 25%, no more than 30%, no more than 35%, no more than 40%, or no more than 45% greater than the tensile strength along the cross-web direction.

The provided non-woven fibrous webs can be characterized, in an acoustic context, by their flow resistance and acoustic specific impedance. Flow resistance represents the pressure difference between the two sides of the web with particle velocity going through the layer, whereas acoustic specific impedance is ratio of acoustic pressure to the associated particle speed in a given medium. Both properties can be measured in units of MKS Rayls, where 1 Rayl is equal to 1 pascal-second per meter (Pa·s/m), or equivalently, 1 newton-second per cubic meter (N·s/m$^3$), or alternatively, 1 kg/[s·m$^2$].

Transfer impedance is the difference between the specific acoustic impedance on the incident side of the web and the specific acoustic impedance one would observe if the web were not present—that is, the acoustic impedance of an adjacent air cavity alone. The relationship between these parameters and acoustic performance properties as a function of sound frequency are described in further detail in U.S. Pat. No. 6,256,600 (Bolton et al.).

For low frequency acoustic performance, the flow resistance through the densified layer of the non-woven fibrous web can be from 800 MKS Rayls to 10,000 MKS Rayls, 1000 MKS Rayls to 2000 MKS Rayls, or 1000 MKS Rayls to 1500 MKS Rayls. For a general broadband acoustic absorption, the densified layer can have a flow resistance of from 300 MKS Rayls to 700 MKS Rayls. For high tensile strength applications, the densified layer can have a flow resistance of from 20 MKS Rayls to 100 MKS Rayls. In various embodiments, the flow resistance through the provided non-woven fibrous web is less than, equal to, or greater than 20 MKS Rayls, 25, 30, 35, 40, 45, 50, 60, 70, 80, 90, 100, 120, 150, 170, 200, 250, 300, 350, 400, 450, 500, 550, 600, 650, 700, 750, 800, 900, 1000, 1200, 1500, 1700, 2000, 2500, 3000, 3500, 4000, 4500, 5000, 6000, 7000, 8000, 9000, or 10,000 MKS Rayls.

The flow resistance through the densified layer of the provided non-woven fibrous webs can account for a significant portion of the overall flow resistance of the web. The flow resistance through the densified layer alone can be, for example, at least 20%, at least 40%, at least 80%, or in some embodiments, less than, equal to, or more than, 20%, 22, 25, 27, 30, 32, 35, 37, 40, 42, 45, 47, 50, 52, 55, 57, 60, 62, 65, 67, 70, 72, 75, 77, or 80% of the flow resistance of the overall non-woven fibrous web.

The solidity of the provided non-woven fibrous webs is a dimensionless quantity representing the fraction of a given volume occupied by solid structure. In exemplary embodiments, the densified layer of the provided non-woven fibrous webs can have a solidity that is at least 10%, at least 15% or at least 20%. These values of solidity can be up to 3 times that of the portion of the non-woven fibrous web that is not densified. Solidity can be characterized as described in U.S. Patent Publication No. 2016/0298266 (Zillig et al.).

Having a low solidity enables the provided non-woven fibrous webs to achieve a low basis weight, which is advantageous for lightweight applications. In exemplary embodiments, the provided non-woven fibrous webs have a basis weight of 60 g/m² to 1500 g/m², 100 g/m² to 800 g/m² or 300 g/m² to 700 g/m². In some embodiments, the provided non-woven fibrous web has a basis weight less than, equal to, or greater than 60 g/m², 65, 70, 75, 80, 85, 90, 95, 100, 110, 120, 130, 140, 150, 160, 170, 180, 190, 200, 250, 300, 350, 400, 450, 500, 550, 600, 650, 700, 750, 800, 850, 900, 950, 1000, 1100, 1200, 1300, 1400, or 1500 g/m².

The above properties are directed to the non-woven fibrous web as a whole. In some embodiments, it is to be understood that any of the ranges above with respect to the acoustic transfer impedance, flow resistance, solidity, and basis weight can apply to a densified layer or a non-densified layer of the non-woven fibrous web in isolation.

The fibers of the provided non-woven fibrous webs can be made from a material having a modulus (i.e., tensile modulus) that is tuned to vibrate in response to incident sound waves having relevant frequencies. Local vibrations of the fibers themselves can dissipate sound energy and enhance transmission loss through the non-woven fibrous web. The modulus, reflecting the stiffness, of the provided non-woven fibrous web also directly affects its acoustic transfer impedance.

In some embodiments, the fibers comprise a material having a modulus of from 0.2 GPa to 10 GPa, 0.2 GPa to 7 GPa, 0.2 GPa to 4 GPa, or in some embodiments, less than, equal to, or greater than a modulus of 0.2 GPa, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, or 10 GPa.

While not intended to be exhaustive, further illustrative embodiments of the fibrous non-woven webs, articles assemblies, and methods thereof are enumerated as follows:

1. A non-woven fibrous web comprising: a plurality of fibers comprising a thermoplastic polymer; and a plurality of heterogeneous inclusions evenly distributed throughout the plurality of fibers; wherein the non-woven fibrous web has at least one major surface processed to form a layer that is densified relative to a remaining portion of the non-woven fibrous web.
2. The non-woven fibrous web of embodiment 1, wherein the median fiber diameters of the densified and non-densified portions of the non-woven fibrous web are substantially the same.
3. The non-woven fibrous web of embodiment 1 or 2, wherein the thermoplastic polymer comprises a thermoplastic polyamide.
4. The non-woven fibrous web of embodiment 3, wherein the thermoplastic polyamide is selected from the group consisting of: aliphatic polyamides, polypthalamides, and aramids.
5. The non-woven fibrous web of embodiment 1 or 2, wherein the thermoplastic polymer comprises an aliphatic semicrystalline polyester.
6. The non-woven fibrous web of embodiment 5, wherein the aliphatic semicrystalline polyester is selected from the group consisting of: polylactic acid, polyhydroxybutyrate, polycaprolactone, polyhydroxyalkanoates, polyglycolide, polybutylene succinate, poly(3-hydroxybutyrate-co-3-hydroxyvalerate) and polyethylene adipate.
7. The non-woven fibrous web of embodiment 1 or 2, wherein the thermoplastic polymer comprises an aromatic polyester.
8. The non-woven fibrous web of embodiment 7, wherein the aromatic polyester is selected from the group consisting of: polyethylene terephthalate, polybutylene terephthalate, polytrimethylene terephthalate, polyethylene naphthalate and liquid crystal polyester.
9. The non-woven fibrous web of any one of embodiments 1-8, wherein the heterogeneous inclusions comprise polyolefin aggregates.
10. The non-woven fibrous web of embodiment 9, wherein the polyolefin aggregates comprise polypropylene aggregates.
11. The non-woven fibrous web of embodiment 1 or 2, wherein the heterogeneous inclusions comprise a thermoplastic semicrystalline polymer having a weight average molecular weight of greater than 20,000 g/mol and selected from the group consisting of polyoxymethylene, poly(vinylidine fluoride), poly(ethylene-chlorotrifluoroethylene), poly(vinyl fluoride), poly(ethylene oxide), polycaprolactone, semicrystalline aliphatic polyamides, and thermotropic liquid crystal polymers.
12. The non-woven fibrous web of any one of embodiments 1-11, wherein the heterogeneous inclusions have an average size that is up to 7% of the median diameter of the plurality of fibers.

13. The non-woven fibrous web of embodiment 12, wherein the heterogeneous inclusions have an average size that is from 0.001% to 7% of the median diameter of the plurality of fibers.

14. The non-woven fibrous web of embodiment 13, wherein the heterogeneous inclusions have an average size that is from 0.01% to 3% of the median diameter of the plurality of fibers.

15. The non-woven fibrous web of any one of embodiments 1-14, wherein the heterogeneous inclusions are present in an amount of from 0.01% to 10% by weight relative to the overall weight of the non-woven fibrous web.

16. The non-woven fibrous web of embodiment 15, wherein the heterogeneous inclusions are present in an amount of from 0.1% to 4% by weight relative to the overall weight of the non-woven fibrous web.

17. The non-woven fibrous web of embodiment 16, wherein the heterogeneous inclusions are present in an amount of from 0.4% to 2% by weight relative to the overall weight of the non-woven fibrous web.

18. A non-woven fibrous web comprising: a plurality of fibers comprising one or more aliphatic polyesters selected from polylactic acid, polyglycolic acid, poly(lactic-co-glycolic acid), polybutylene succinate, polyhydroxy-butyrate, polyhydroxyvalerate, and blends and copolymers thereof; wherein the non-woven fibrous web has at least one major surface processed to form a layer that is densified relative to a remaining portion of the non-woven fibrous web.

19. The non-woven fibrous web of embodiment 18, wherein no significant melting of the plurality of fibers is present in the layer of the non-woven fibrous web that is densified.

20. The non-woven fibrous web of embodiment 18 or 19, wherein the plurality of fibers has a median fiber diameter of from 0.1 micrometers to 10 micrometers.

21. The non-woven fibrous web of embodiment 20, wherein the plurality of fibers has a median fiber diameter of from 0.3 micrometers to 6 micrometers.

22. The non-woven fibrous web of embodiment 21, wherein the plurality of fibers has a median fiber diameter of from 0.3 micrometers to 3 micrometers.

23. The non-woven fibrous web of any one of embodiments 18-22, wherein the plurality of fibers has a weight average molecular weight of from 15,000 g/mol to 6,000,000 g/mol.

24. The non-woven fibrous web of embodiment 23, wherein the plurality of fibers has a weight average molecular weight of from 20,000 g/mol to 2,000,000 g/mol.

25. The non-woven fibrous web of embodiment 24, wherein the plurality of fibers has a weight average molecular weight of from 40,000 g/mol to 1,000,000 g/mol.

26. A non-woven fibrous web comprising: a plurality of first fibers comprising one or more thermoplastic semicrystalline polyesters and having a median diameter of up to 10 micrometers; wherein the non-woven fibrous web has at least one major surface processed to form a layer that is densified relative to a remaining portion of the non-woven fibrous web.

27. The non-woven fibrous web of embodiment 26, wherein the plurality of first fibers comprise meltblown fibers.

28. The non-woven fibrous web of embodiment 26, wherein the plurality of first fibers comprise melt spun fibers.

29. The non-woven fibrous web of any one of embodiments 26-28, wherein the plurality of first fibers have a median diameter of up to 6 micrometers.

30. The non-woven fibrous web of embodiment 29, wherein the plurality of first fibers have a median diameter of up to 3 micrometers.

31. The non-woven fibrous web of any one of embodiments 26-30, further comprising a plurality of second fibers comprising one or more thermoplastic semicrystalline polyesters and having a median diameter of at least 10 micrometers.

32. The non-woven fibrous web of embodiment 31, wherein the plurality of second fibers have a median diameter of from 10 micrometers to 60 micrometers.

33. The non-woven fibrous web of embodiment 32, wherein the plurality of second fibers have a median diameter of from 20 micrometers to 40 micrometers.

34. The non-woven fibrous web of any one of embodiments 31-33, wherein at least some of the plurality of second fibers are oriented.

35. The non-woven fibrous web of any one of embodiments 26-34, further comprising a high surface area filler comprising one or more of: natural fibers, recycled fibers, recycled foams, and recycled films.

36. The non-woven fibrous web of embodiment 35, wherein the high surface area filler has a median size of from 5 micrometers to 500,000 micrometers.

37. The non-woven fibrous web of embodiment 36, wherein the high surface area filler has a median size of from 10 micrometers to 100,000 micrometers.

38. The non-woven fibrous web of embodiment 37, wherein the high surface area filler has a median size of from 30 micrometers to 50,000 micrometers.

39. A non-woven fibrous web comprising: a plurality of fibers having a median fiber diameter of up to 6 micrometers, wherein the plurality of fibers comprise at least 35 weight % of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a copolymer or blend thereof; wherein the non-woven fibrous web has at least one major surface processed to form a layer that is densified relative to a remaining portion of the non-woven fibrous web.

40. The non-woven fibrous web of embodiment 39, wherein the plurality of fibers have a median diameter of from 0.1 micrometers to 3 micrometers.

41. The non-woven fibrous web of embodiment 40, wherein the plurality of fibers have a median diameter of from 0.2 micrometers to 1 micrometer.

42. The non-woven fibrous web of any one of embodiments 39-41, wherein the plurality of fibers comprise from 30 weight % to 95 weight % of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a copolymer or blend thereof.

43. The non-woven fibrous web of embodiment 42, wherein the plurality of fibers comprise from 50 weight % to 80 weight % of a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or a copolymer or blend thereof.

44. The non-woven fibrous web of any one of embodiments 39-43, wherein the plurality of fibers comprise polyolefin fibers.

45. The non-woven fibrous web of any one of embodiments 39-44, wherein the polymeric fibers are uniformly distributed within the layer of the non-woven fibrous web that is densified.

46. A non-woven fibrous web comprising: a plurality of melt-blown fibers comprising at least one thermoplastic semi-crystalline polymer, wherein the at least one thermoplastic semi-crystalline polymer does not contain a heterogeneous inclusion in an amount effective to achieve nucleation, and further wherein the non-woven fibrous web is dimensionally stable and exhibits a Shrinkage after being heated to 150° C. for 7 days of less than 15%; wherein the non-woven fibrous web has at least one major surface processed to form a layer that is densified relative to a remaining portion of the non-woven fibrous web.

47. The non-woven fibrous web of embodiment 46, wherein the at least one semi-crystalline polymer comprises an aliphatic polyester, an aromatic polyester, or a combination thereof.

48. The non-woven fibrous web of embodiment 46 or 47, wherein the at least one thermoplastic semi-crystalline polymer comprises polyethylene terephthalate, polybutylene terephthalate, polyethylene naphthalate, polylactic acid, polyhydroxyl butyrate, polytrimethylene terephthalate, or a combination thereof.

49. The non-woven fibrous web of any one of embodiments 46-48, wherein the at least one thermoplastic semi-crystalline polymer comprises a blend of a polyester and at least one other polymer.

50. The non-woven fibrous web of any one of embodiments 46-49, wherein the plurality of melt-blown fibers have a median fiber diameter up to 10 micrometers.

51. The non-woven fibrous web of embodiment 50, wherein the plurality of melt-blown fibers have a median fiber diameter of from 0.1 micrometers to 6 micrometers.

52. The non-woven fibrous web of embodiment 51, wherein the plurality of melt-blown fibers have a median fiber diameter of from 0.1 micrometers to 3 micrometers.

53. A non-woven fibrous web comprising: a plurality of fibers comprising an amorphous polymer; and wherein the non-woven fibrous web has at least one major surface processed to form a layer that is densified relative to a remaining portion of the non-woven fibrous web.

54. The non-woven fibrous web of embodiment 53, wherein the amorphous polymer comprises one or more of polycarbonate, polystyrene, polyetherimide, polyethylene terephthalate glycol, acrylonitrile butadiene styrene copolymer, ethylene butylene styrene copolymer, cyclic olefins, and copolymers and blends thereof 55. The non-woven fibrous web of embodiment 53 or 54, wherein the median fiber diameters of the densified and non-densified portions of the non-woven fibrous web are substantially the same.

56. The non-woven fibrous web of any one of embodiments 53-55, wherein the non-woven fibrous web is dimensionally stable.

57. The non-woven fibrous web of any one of embodiments 53-56, wherein no significant melting of the plurality of fibers is present in the layer of the non-woven fibrous web that is densified.

58. The non-woven fibrous web of any one of embodiments 1-57, wherein the non-woven fibrous web has two opposing major surfaces, each processed to form a respective layer that is densified relative to a remaining portion of the non-woven fibrous web.

59. The non-woven fibrous web of any one of embodiments 1-58, wherein the densified layer is an intermediate layer disposed between two layers that are not densified.

60. The non-woven fibrous web of any one of embodiments 1-59, wherein the densified layer has a flow resistance ranging from 800 MKS Rayls to 10,000 MKS Rayls.

61. The non-woven fibrous web of any one of embodiments 1-59, wherein the densified layer has a flow resistance ranging from 300 MKS Rayls to 700 MKS Rayls.

62. The non-woven fibrous web of any one of embodiments 1-59, wherein the densified layer has a flow resistance ranging from 20 MKS Rayls to 100 MKS Rayls.

63. The non-woven fibrous web of any one of embodiments 1-62, wherein the densified layer has a flow resistance at least 20% of the flow resistance of the overall non-woven fibrous web.

64. The non-woven fibrous web of embodiment 63, wherein the densified layer has a flow resistance at least 40% of the flow resistance of the overall non-woven fibrous web.

65. The non-woven fibrous web of embodiment 64, wherein the densified layer has a flow resistance at least 80% of the flow resistance of the overall non-woven fibrous web.

66. A three-dimensional shaped article made from the non-woven fibrous web of any one of embodiments 1-65.

67. A three-dimensional shaped article of embodiment 66, wherein the three-dimensional shaped article is formed by thermally molding the non-woven fibrous web against a three-dimensional shaped tool.

68. A three-dimensional shaped article of embodiment 66 or 67, wherein the densified layer of the non-woven fibrous web is formed by thermally molding against a three-dimensional shaped tool.

69. The three-dimensional shaped article of any one of embodiments 66-68, wherein the densified layer of the non-woven fibrous web has a volumetric density that varies along a major surface of the non-woven fibrous web.

70. The three-dimensional shaped article of embodiment 69, wherein the volumetric density of the densified layer over a first area along a major surface is 30% greater than that over a second area along the major surface.

71. The three-dimensional shaped article of embodiment 70, wherein the volumetric density of the densified layer over a first area along a major surface is 50% greater than that over a second area along the major surface.
72. The three-dimensional shaped article of embodiment 71, wherein the volumetric density of the densified layer over a first area along a major surface is 70% greater than that over a second area along the major surface.
73. A method of selectively densifying a non-woven fibrous web comprising: locally heating opposing major surfaces of an amorphous non-woven fibrous web to an annealing temperature to produce, within the non-woven fibrous web, top and bottom layers that are semi-crystalline and an intermediate layer that remains amorphous; optionally allowing the non-woven fibrous web to cool; heating the entire non-woven fibrous web to a processing temperature greater than the annealing temperature; and compressing the entire non-woven fibrous web whereby the intermediate layer densifies while the semi-crystalline top and bottom layers do not.
74. A method of making a three-dimensional shaped article comprising: providing the non-woven fibrous web of any one of embodiments 1-65; and thermally molding the non-woven fibrous web to obtain the three-dimensional shaped article.
75. A method of making a three-dimensional shaped article comprising: providing a non-woven fibrous web comprising a plurality of fibers comprising at least one thermoplastic semi-crystalline polymer; and thermally molding the non-woven fibrous web to obtain the three-dimensional shaped article to form a layer along at least one major surface of the non-woven fibrous web that is densified relative to a remaining portion of the non-woven fibrous web.
76. The method of embodiment 75, wherein the densified layer of the non-woven fibrous web is sufficient to provide dimensional stability to the three-dimensional shaped article.
77. The method of any one of embodiments 74-76, wherein thermally molding the non-woven fibrous web comprises placing the non-woven fibrous web in contact with a three-dimensional shaped tool.
78. The method of any one of embodiments 77, further comprising heating the three-dimensional shaped tool prior to thermally molding the non-woven fibrous web.
79. The method of embodiment 77 or 78, further comprising heating the non-woven fibrous web prior to placing the non-woven fibrous web in contact with the three-dimensional shaped tool.
80. The method of embodiment 79, wherein heating the non-woven fibrous web comprises directing heated air at the non-woven fibrous web.
81. The method of any one of embodiments 74-80, wherein no significant melting of the plurality of fibers occurs when thermally molding the non-woven fibrous web.

EXAMPLES

TABLE 1

Materials

| Designation | Description | Source |
| --- | --- | --- |
| PP 3860 | Polypropylene, available under the trade designation "TOTAL 3860" | Total Petrochemicals USA, Houston, TX |
| PET N211 | Polyethylene terephthalate ("PET"), intrinsic viscosity of 0.52, available under the trade designation "N211" | Nan Ya Plastics Corporation USA, Wharton, TX |
| Nylon | Nylon 6, available under the trade designation "ULTRAMID B24 N 03" | BASF, Ludwigshafen, Germany |
| PPS | Polyphenylene sulfide, available under the trade designation "FORTRON 0203" | Celanese Corp., Irving, TX |
| PET staple fibers | Polyethylene terephthalate staple fibers, 6 denier, 51 mm type 295 fiber | AURIGA Polymers, Inc., Spartanburg, SC |
| Nylon staple fibers | Nylon staple fibers, N250HT 15 denier | EMS Grilltec, Domat/EMS, Switzerland |
| PLA | Polylactic acid, available under the trade designation "PLA POLYMER 6252D" | Natureworks, Inc., Blaire, NE |
| PLA staple fiber | Polylactic acid staple fibers, 7 denier by 2 inch (5 cm), available under the trade designation "T-820" | Fiber Innovation Technology, Johnson City, TN |

Test Methods

Thickness of Total Web

Thickness of the total web (including non-densified layer and densified layer) was measured by obtaining (by die cutting) a 12.45 inch×12.45 inch (31.6 cm×31.6 cm) section of the web and measuring the web thickness with a 130 g weight evenly distributed across the section of the web.

Basis Weight of Total Web

The web material was die cut to obtain a 133 mm circular disk, and the weight was measured. Dividing the measured weight of the web by the circular disk area provided the Basis Weight of the total web, which was reported in grams per square meter ("gsm").

Flow Resistance Across Total Web

The flow resistance across total web samples (133 mm circular disk) was measured according to ASTM C-522-03 (Reapproved 2009), "Standard Test Method for Airflow Resistance of Acoustical Materials". The airflow measurement for each sample was measured at the thickness determined for that sample, according the "Thickness of Total Web" test method. The flow resistance test method covers the measurement of airflow resistance and the related measurements of specific airflow resistance and airflow resistivity of porous materials that can be used for the absorption and attenuation of sound, and is designed for the measurement of values of specific airflow resistance ranging from 100 to 10,000 mks Rayls (Pa·s/m) with linear airflow velocities ranging from 0.5 to 50 mm/s and pressure differences across the specimen ranging from 0.1 to 250 Pa. The equipment used for the measurement was a PERMEAMETER, Model Number GP-522-A, available from Porous Materials, Inc., Ithaca, NY. The flow resistance was reported in Rayls (Pa·s/m).

Process for Manually Peeling Non-Densified Layer from Densified Layer

The Densified Layer portion was removed by manually peeling non-densified layer from the circular disk as follows: the circular disk was placed on a flat surface with the Densified Layer again the flat surface and held there by hand pressure at one edge. With the other hand, small tuffs (0.5-1.0 gram) were grabbed and pulled parallel to the surface, being careful not to pull too much and damage/rip the Densified Layer. The hand holding down the densified layer was kept very close to the tufts being pulled off, and the pulling was continued until essentially all of the non-densified layer was removed from the circular disk, leaving a "manually peeled Densified Layer portion".

Basis Weight of Densified Layer

The weight of the "manually peeled Densified Layer portion" was then measured. Dividing the measured weight of the "manually peeled Densified Layer portion" by its circular area provided the Basis Weight of the Densified Layer, which was reported in grams per square meter ("gsm").

Thickness of Densified Layer

The thickness of the "manually peeled Densified Layer portion" was then measured according to EDANA Thickness 30.5-99 test standard, using a PRO GAGE THICKNESS TESTER, available from Thwing-Albert Instrument Company, West Berlin, NJ. The average result of three measurements was reported in millimeters.

Flow Resistance Across Densified Layer

The Flow resistance across the "manually peeled Densified Layer portion" was then measured according to ASTM C-522-03 (Reapproved 2009), "Standard Test Method for Airflow Resistance of Acoustical Materials". The airflow measurement for each sample was measured at the thickness determined for that sample, according the "Thickness of Densified Layer" test method. The flow resistance test method covers the measurement of airflow resistance and the related measurements of specific airflow resistance and airflow resistivity of porous materials that can be used for the absorption and attenuation of sound, and is designed for the measurement of values of specific airflow resistance ranging from 100 to 10,000 mks Rayls (Pa·s/m) with linear airflow velocities ranging from 0.5 to 50 mm/s and pressure differences across the specimen ranging from 0.1 to 250 Pa. The equipment used for the measurement was a PERMEAMETER, Model Number GP-522-A, available from Porous Materials, Inc., Ithaca, NY. The flow resistance was reported in Rayls (Pa·s/m).

Effective Fiber Diameter

The Effective Fiber Diameter (EFD) of a web was evaluated according to the method set forth in Davies, C. N., "The Separation of Airborne Dust and Particles, Institution of Mechanical Engineers, London, Proceedings 1B, 1952". Unless otherwise noted, the test was run at a face velocity of 14 cm/sec.

The Fiber Diameter (EFD) of the melt blown webs of the examples ranged from 6.0-7.0 micrometers.

Comparative Example 1 (CE-1)—PET Web

Nonwoven melt blown webs of the present disclosure were prepared by a process similar to that described in Wente, Van A., "Superfine Thermoplastic Fibers" in Industrial Engineering Chemistry, Vol. 48, pages 1342 et seq. (1956), and in Report No. 4364 of the Naval Research Laboratories, published May 25, 1954 entitled "Manufacture of Superfine Organic Fibers" by Wente, Van. A. Boone, C. D., and Fluharty, E. L., except that a drilled die was used to produce the fibers.

PET resin having 0.45 intrinsic viscosity (obtained by a partial hydrolysis of PET NT11 resin (0.55 intrinsic viscosity)) was extruded through the die into a high velocity stream of heated air which draws out and attenuates the PET blown microfibers ("PET BMF") prior to their solidification and collection.

The stream of PET blown microfibers was blended with PET staple fibers according to the method described in U.S. Pat. No. 4,118,531 (Hauser), and the blend of PET BMF and PET stable fibers was collected in a random fashion on a nylon belt, affording the PET web of CE-1.

A device according U.S. Patent Publication No. 2016/298266—see part 32 in FIG. 1B—was used to achieve web shrinkage measurements after being heated to 150° C. for 7 days of below 15%. The web shrinkage measurements were made according to U.S. Patent Publication No. 2016/298266, paragraph [0184], incorporated herein by reference.

The composition of the resulting web was 65% by weight of PET BMF, and 35% by weight of the PET staple fibers, as listed in Table 2.

TABLE 2

| Example | Web material blend |
|---|---|
| CE-1 | 65 wt. % PET BMF/35 wt. % PET Staple Fiber; |
| EX-1 | 65 wt. % PET BMF/35 wt. % PET Staple Fiber |
| CE-2 | 65 wt. % (99.4 wt. % PPS, 0.6 wt. % PP 3860) BMF/35 wt. % PET Staple Fiber |
| EX-2 | 65 wt. % (99.4 wt. % PPS, 0.6 wt. % PP 3860) BMF/35 wt. % PET Staple Fiber |
| CE-3 | 65 wt. % Nylon BMF/35 wt. % Nylon Staple Fiber |
| EX-3 | 65 wt. % Nylon BMF/35 wt. % Nylon Staple Fiber |
| CE-4 | 58 wt. % Polypropylene BMF/42 wt. % PET Staple Fiber |
| EX-4 | 58 wt. % Polypropylene BMF/42 wt. % PET Staple Fiber |

Example 1 (EX-1) PET Web Having Densified Layer

The PET nonwoven melt blown microfibrous web was produced according to the procedure described for Comparative Example 1, having the web material blend listed in Table 2. The PET web of CE-1 was further subjected to a controlled heating and compression cycle, where the web was heated on a device described in U.S. Pat. No. 9,139,940 (see device 101 in FIGS. 1 and 5 of U.S. Pat. No. 9,139,940, device 101 having outlet 109 shown in FIGS. 4 and 5 of U.S. Pat. No. 9,139,940) and then compressed with a 4.45 cm diameter rod with a 0.5 kg per cm compressive forced on the web to produce the Example 1 PET web having a densified layer. The outlet (i.e., 109 of FIGS. 4 and 5 in U.S. Pat. No. 9,139,940) was 7.6 cm by 61 cm, and the outlet temperature and air flow rate was as listed in Table 3. Cooling air (i.e., 120 of FIGS. 1 and 4 in U.S. Pat. No. 9,139,940) having a temperature of 21° C. had the flow rate listed in Table 3.

TABLE 3

| Example | Web speed m/min | Outlet Temp, ° C. | Outlet air flow rate m/sec | Cooling air (21° C.) flow rate m/sec |
|---------|---|---|---|---|
| EX-1 | 3 | 235 | 3.9 | 3.0 |
| EX-2 | 1.5 | 280 | 3.0 | 3.1 |
| EX-3 | 1.5 | 235 | 4.7 | 2.6 |
| EX-4 | 1.5 | 158 | 4.7 | 3.1 |

Comparative Example 2 (CE-2)

A nonwoven melt blown microfibrous web was produced according to the procedure described for Comparative Example 1, except using the PPS/PP web material blend and PET staple fibers, all in the weight percentages listed in Table 2. Here, the PP component of the fibers provided heterogenous inclusions embedded in a continuous PPS phase.

Example 2 (EX-2)

The nonwoven melt blown microfibrous web of CE-2 was further subjected to a controlled heating and compression cycle, according to the processing details described for Example 1, to produce the Example 2 web having a densified layer. The web speed, outlet temperature, outlet airflow and cooling air flow rate were each as listed in Table 3.

Comparative Example 3 (CE-3)

A nonwoven melt blown microfibrous web was produced according to the procedure described for Comparative Example 1, except using the Nylon BMF web material and Nylon staple fibers, all in the weight percentages listed in Table 2.

Example 3 (EX-3)

The nonwoven melt blown microfibrous web of CE-3 was further subjected to a controlled heating and compression cycle, according to the processing details described for Example 1, to produce the Example 3 web having a densified layer. The web speed, outlet temperature, outlet airflow and cooling air flow rate were each as listed in Table 3.

Comparative Example 4 (CE-4)

A nonwoven melt blown microfibrous web was produced according to the procedure described for Comparative Example 1, except using the Polypropylene BMF web material and PET staple fibers, all in the weight percentages listed in Table 2.

Example 4 (EX-4)

The nonwoven melt blown microfibrous web of CE-4 was further subjected to a controlled heating and compression cycle, according to the processing details described for Example 1, to produce the Example 4 web having a densified layer. The web speed, outlet temperature, outlet airflow and cooling air flow rate were each as listed in Table 3.

Samples of the web materials were tested for Basis Weight Total, Basis Weight for the Densified layer, Thickness Total, Thickness for the Densified Layer, Flow Resistance Total, and Flow Resistance for the Densified Layer. These samples EX-1 to EX-4 were dimensionally stable.

TABLE 4

| Materials (major component of web) | Basis Weight Total/ Densified, gsm | Thickness Total/ Densified, mm | Flow Resistance Total/ Densified, Rayls |
|---|---|---|---|
| CE-1 | PET | 543/none | 20/none | 433/none |
| EX-1 | PET | 607/250 | 20/2.66 | 655/510 |
| CE-2 | PPS | 546/none | 18/none | 452/none |
| EX-2 | PPS | 586/208 | 18/2.68 | 575/302 |
| CE-3 | Nylon | 479/none | 20/none | 1019/none |
| EX-3 | Nylon | 586/175 | 20/2.44 | 1209/593 |
| CE-4 | Polypropylene | 470/none | 20/none | 1193/none |
| EX-4 | Polypropylene | 672/236 | 20/3.01 | 2131/1254 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A non-woven fibrous web comprising:
   a plurality of first fibers consisting essentially of a thermoplastic semicrystalline polyester and having a median diameter of up to 10 micrometers;
   a plurality of second fibers comprising one or more thermoplastic semicrystalline polyesters and having a median diameter of at least 10 micrometers that are interspersed with the plurality of first fibers, wherein the plurality of second fibers are staple fibers;
   wherein the first fibers are melt-blown fibers annealed using an in-flight heat treatment operation at a temperature below a melting temperature of the portion of the first fibers to achieve stress relaxation of at least a portion of molecules within a portion of the first fibers and further wherein the non-woven fibrous web comprises a densified layer and an undensified layer, the non-woven fibrous web having at least one major surface processed to form the densified layer, and wherein the undensified layer extends adjacent to and alongside the densified layer, and represents a remaining portion of the non-woven fibrous web, and further wherein the plurality of melt-blown fibers are bonded to each other at points of fiber intersection while melting of the plurality of first fibers is avoided in the densified layer during web formation,
   characterized in that the non-woven fibrous web has a unitary construction and is dimensionally stable at ambient conditions and resists shrinkage at a temperature exceeding 150° C.

2. The non-woven fibrous web of claim 1, wherein:
   the plurality of first fibers have a median fiber diameter of up to 6 micrometers, wherein the thermoplastic semicrystalline polyester is polyethylene terephthalate.

3. A non-woven fibrous web comprising:
   a plurality of melt-blown fibers consisting essentially of a thermoplastic semi-crystalline polymer annealed using an in-flight heat treatment operation at a temperature below a melting temperature of the portion of the first fibers to achieve stress relaxation of at least a portion of molecules within a portion of the first fibers, wherein the thermoplastic semi-crystalline polymer does not contain a heterogeneous inclusion in an amount effective to achieve nucleation, and further wherein the non-woven fibrous web is dimensionally stable at ambient conditions, has a unitary construction with a densified layer and an undensified layer, and exhibits a Shrinkage less than 15% at a temperature exceeding 150° C.;

a plurality of staple fibers comprising one or more thermoplastic semicrystalline polyesters and having a median diameter of at least 10 micrometers that are interspersed with the plurality of melt-blown fibers;

wherein the non-woven fibrous web has at least one major surface processed to form the densified layer, and wherein the undensified layer extends adjacent to and alongside the densified layer, representing a remaining portion of the non-woven fibrous web, and wherein the plurality of melt-blown fibers are bonded to each other at points of fiber intersection while melting of the plurality of melt-blown fibers is avoided in the densified layer during web formation.

4. The non-woven fibrous web of claim 3, wherein the thermoplastic semi-crystalline polymer is polyethylene terephthalate.

5. The non-woven fibrous web of claim 3, wherein the densified layer is an intermediate layer disposed between two layers that are not densified.

6. The non-woven fibrous web of claim 3, wherein the densified layer has a flow resistance ranging from 800 MKS Rayls to 3,000 MKS Rayls.

7. A three-dimensional shaped article made from the non-woven fibrous web of claim 3, wherein the densified layer of the non-woven fibrous web is formed by thermally molding against a three-dimensional shaped tool.

8. The three-dimensional shaped article of claim 7, wherein the densified layer of the non-woven fibrous web has a volumetric density that varies along a major surface of the non-woven fibrous web.

9. A method of making a three-dimensional shaped article comprising:
 providing the non-woven fibrous web of claim 3; and
 thermally molding the non-woven fibrous web to obtain the three-dimensional shaped article,
 wherein the three-dimensional shaped article has a deep drawn shape in which the depth dimension is greater than 10% of one or both of its lateral dimensions.

10. The non-woven fibrous web of claim 1, wherein the plurality of melt-blown fibers are consisting of the thermoplastic semi-crystalline polymer.

11. The non-woven fibrous web of claim 1, wherein the plurality of melt-blown fibers are consisting of the thermoplastic semi-crystalline polymer.

* * * * *